United States Patent [19]

Clements et al.

[11] Patent Number: 4,545,018

[45] Date of Patent: Oct. 1, 1985

[54] CALIBRATION OF AUTOMATED LASER MACHINING APPARATUS

[75] Inventors: Jack W. Clements, Trafford; John R. Faulkner, Pittsburgh, both of Pa.

[73] Assignee: Westinghouse Electric Corp., Pittsburgh, Pa.

[21] Appl. No.: 414,272

[22] Filed: Sep. 1, 1982

[51] Int. Cl.$^4$ .................. B23K 26/12; G05D 25/00
[52] U.S. Cl. ................... 364/474; 219/121 LA; 219/121 LB; 364/400; 364/559
[58] Field of Search .......... 219/125, 121 LA, 121 LS, 219/121 LM, 121 FS; 364/474, 400, 559

[56] References Cited

U.S. PATENT DOCUMENTS

| | | | |
|---|---|---|---|
| 3,803,379 | 4/1974 | McRay | 219/121 L |
| 4,083,629 | 4/1978 | Kocher et al. | 219/121 FS |
| 4,223,201 | 9/1980 | Peters et al. | 219/121 LS |
| 4,223,202 | 9/1980 | Peters et al. | 219/121 LD |
| 4,327,277 | 4/1982 | Daly | 219/121 LD |

*Primary Examiner*—Jerry Smith
*Assistant Examiner*—Allen MacDonald
*Attorney, Agent, or Firm*—D. E. Erickson

[57] ABSTRACT

A computer controlled apparatus is disclosed for controlling a sequence of machine steps utilizing a laser beam whose power level is adjusted in accordance with its parameters as a function of a measurement of the power level of the generated laser beam. The laser apparatus includes a laser source or rod for emitting a laser beam and means in the illustrative form of a laser lens assembly for focusing and directing the laser beam onto the work piece. The laser source is associated with excitation means in the form of lamps for pulse driving or exciting the laser rod to emit a like sequence of laser pulses, whose parameters, e.g. pulse width and frequency, are selectively varied and controlled. The power level of the laser beam is calibrated by first measuring the power level of the laser beam as directed onto the laser piece, and then by using the measurement of laser power to calibrate or to adjust the degree of lamp excitation.

17 Claims, 33 Drawing Figures

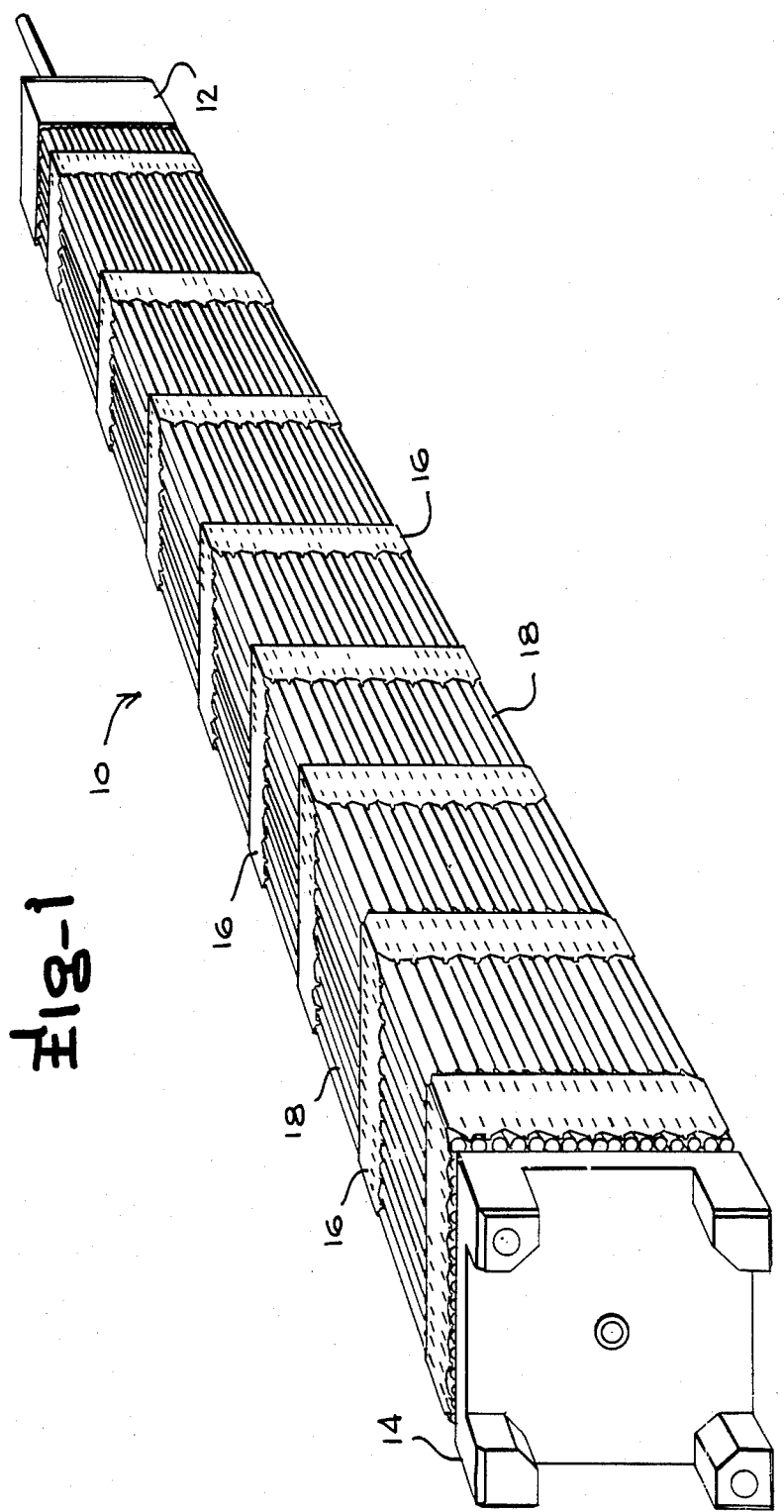

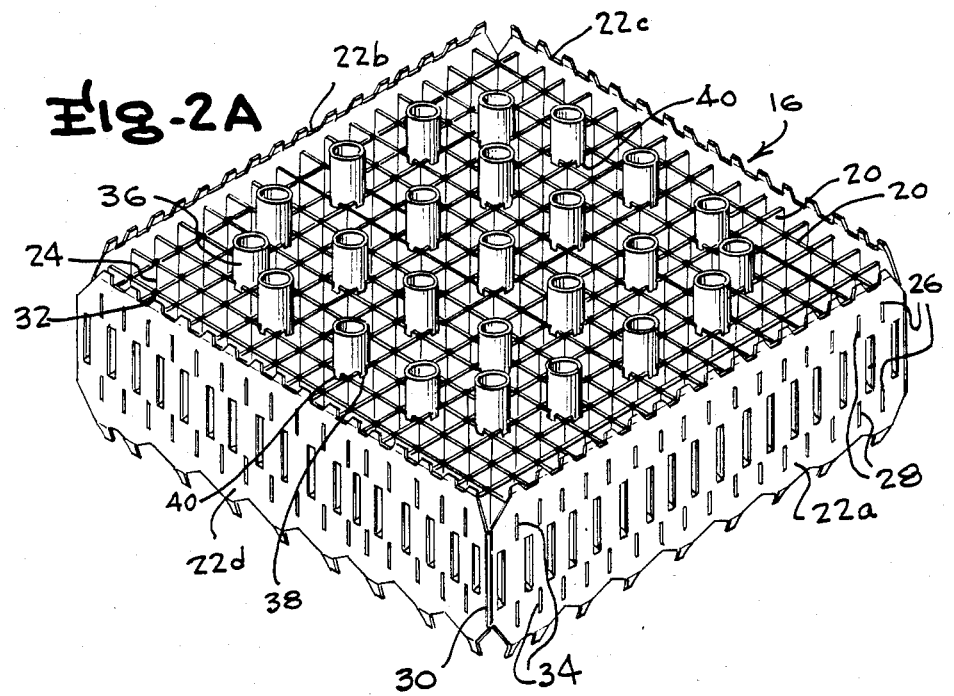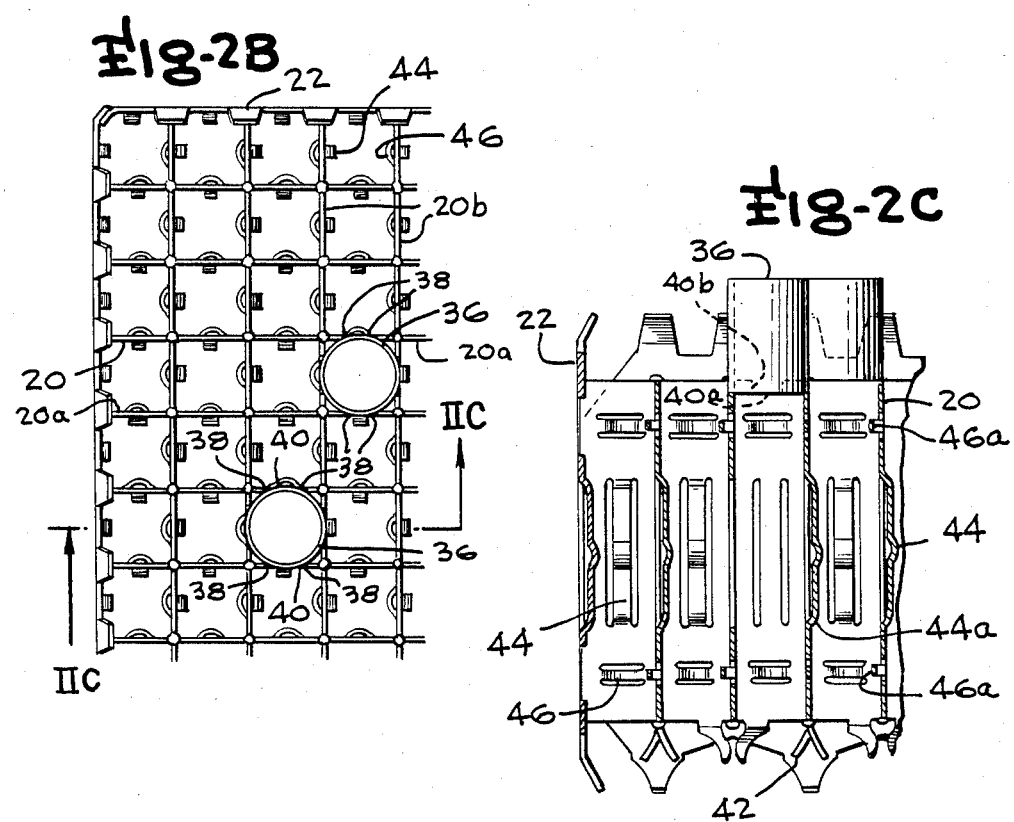

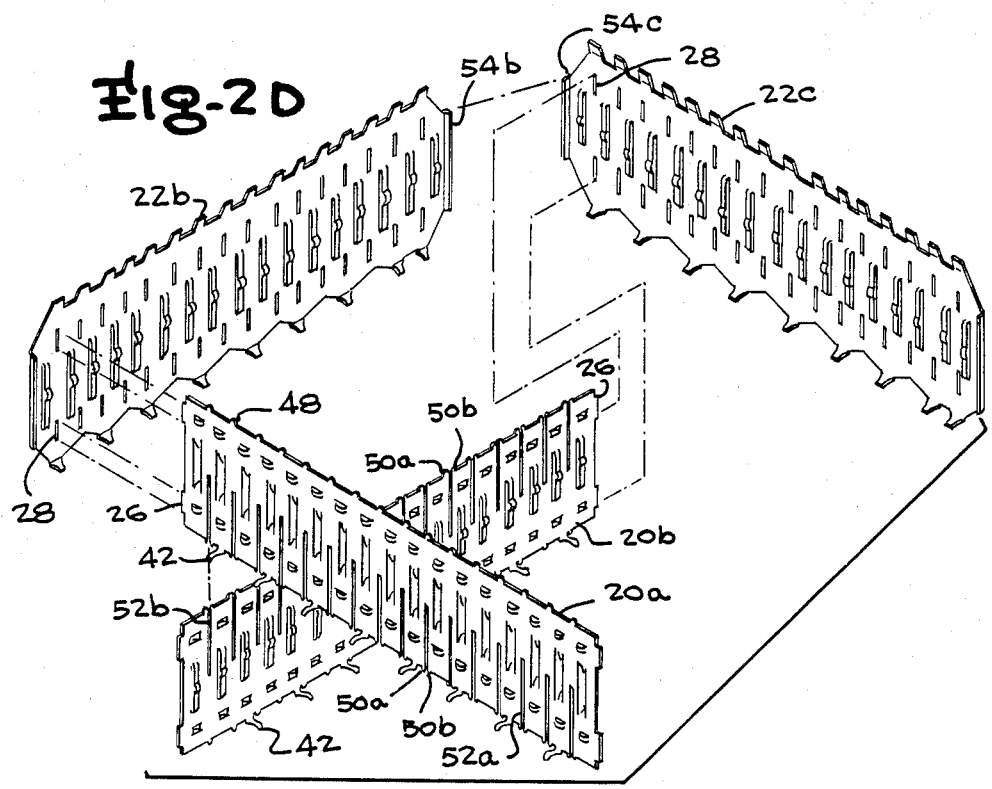
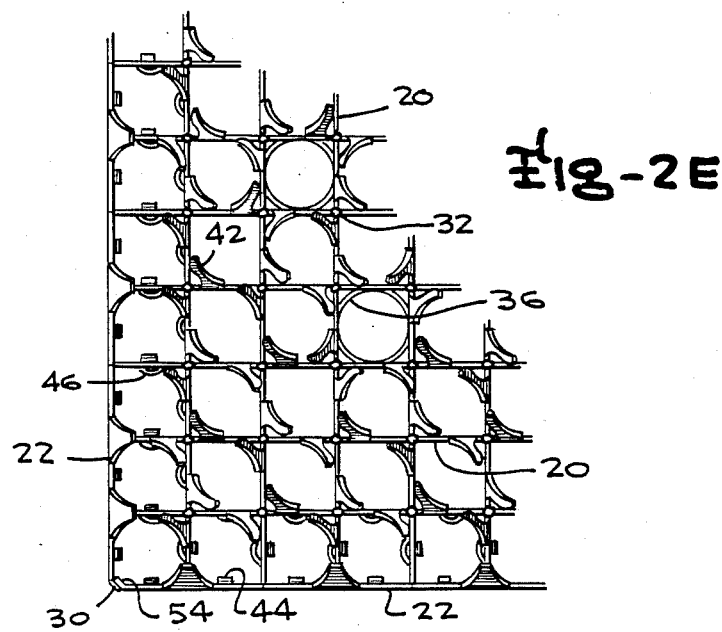

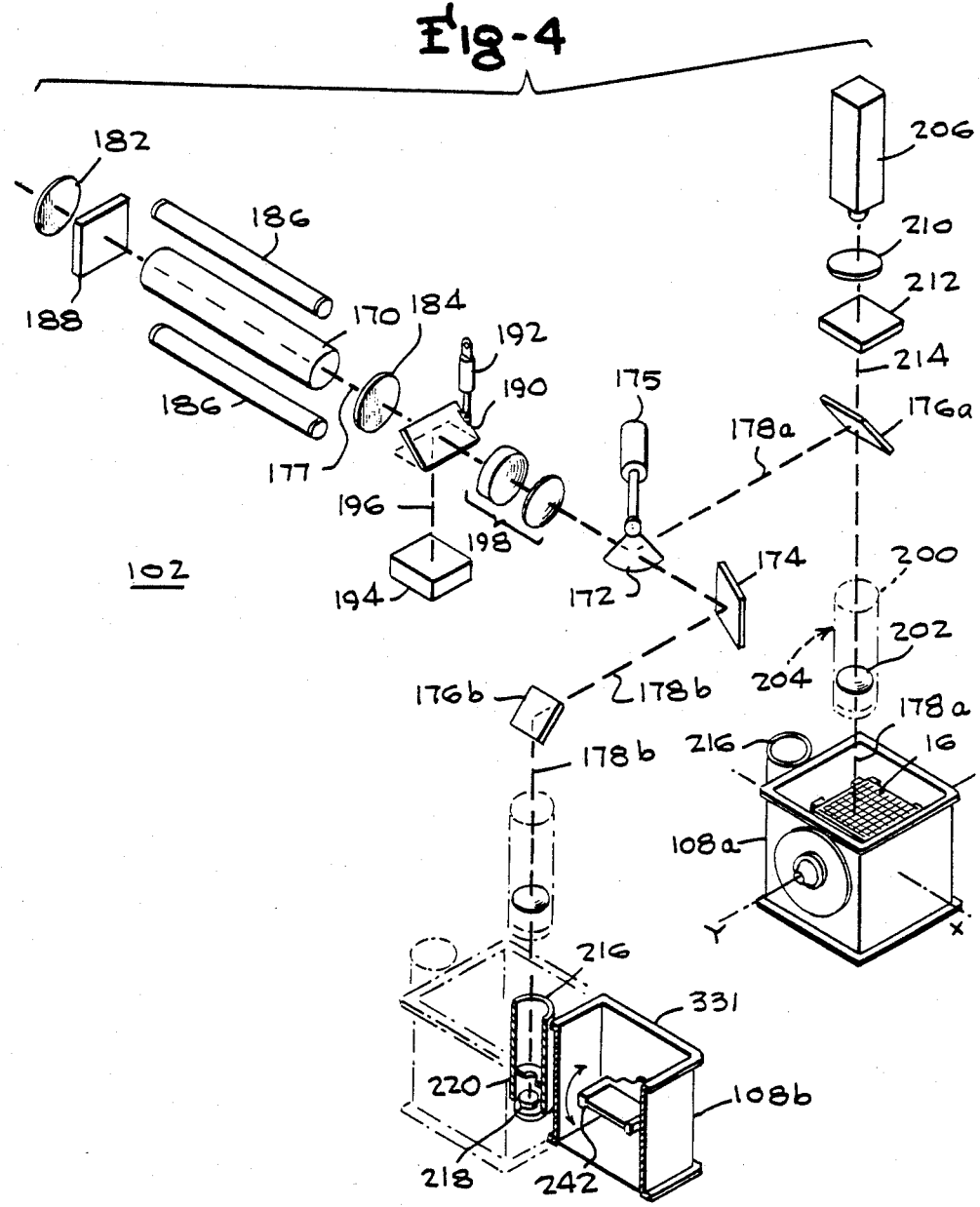

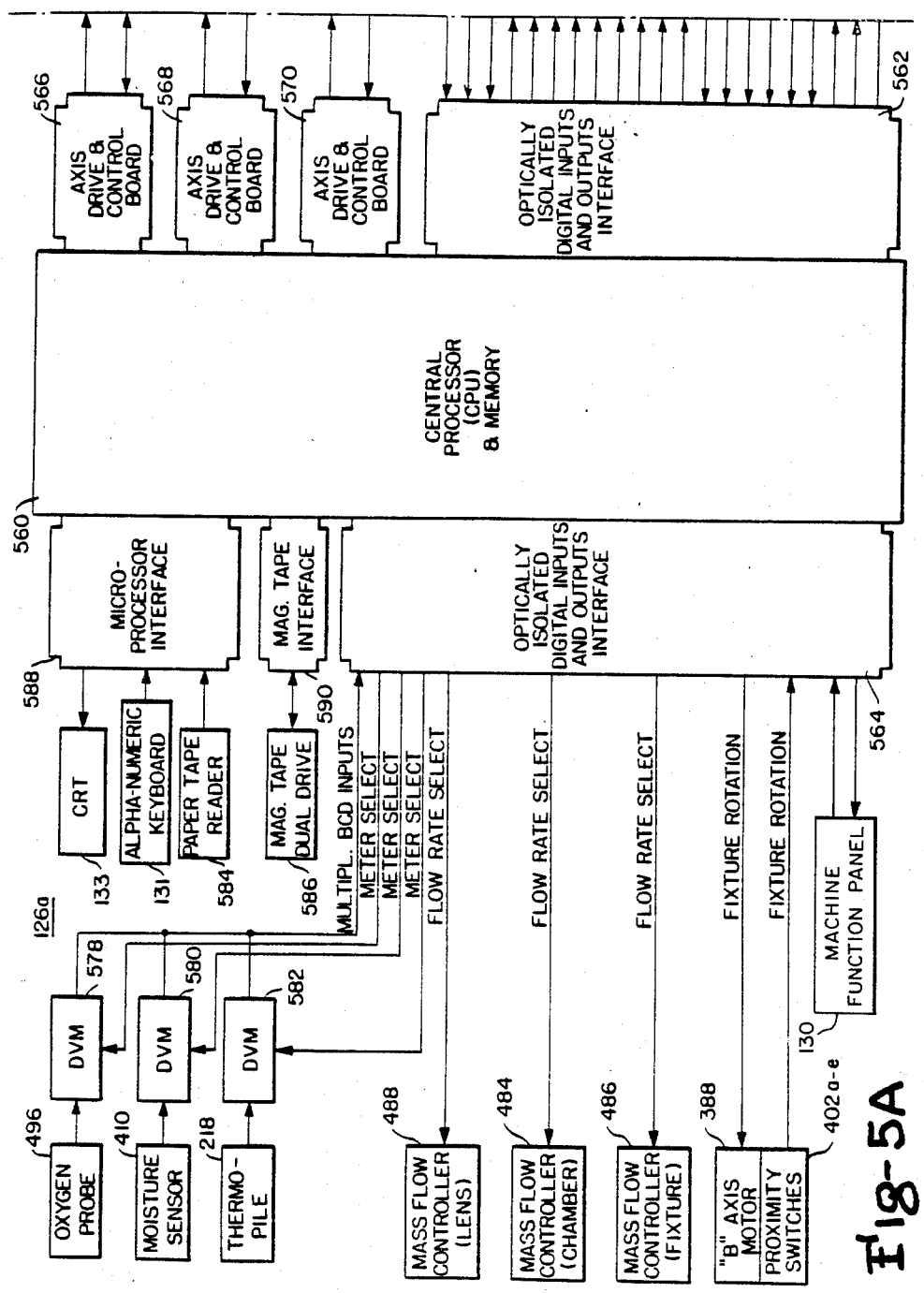

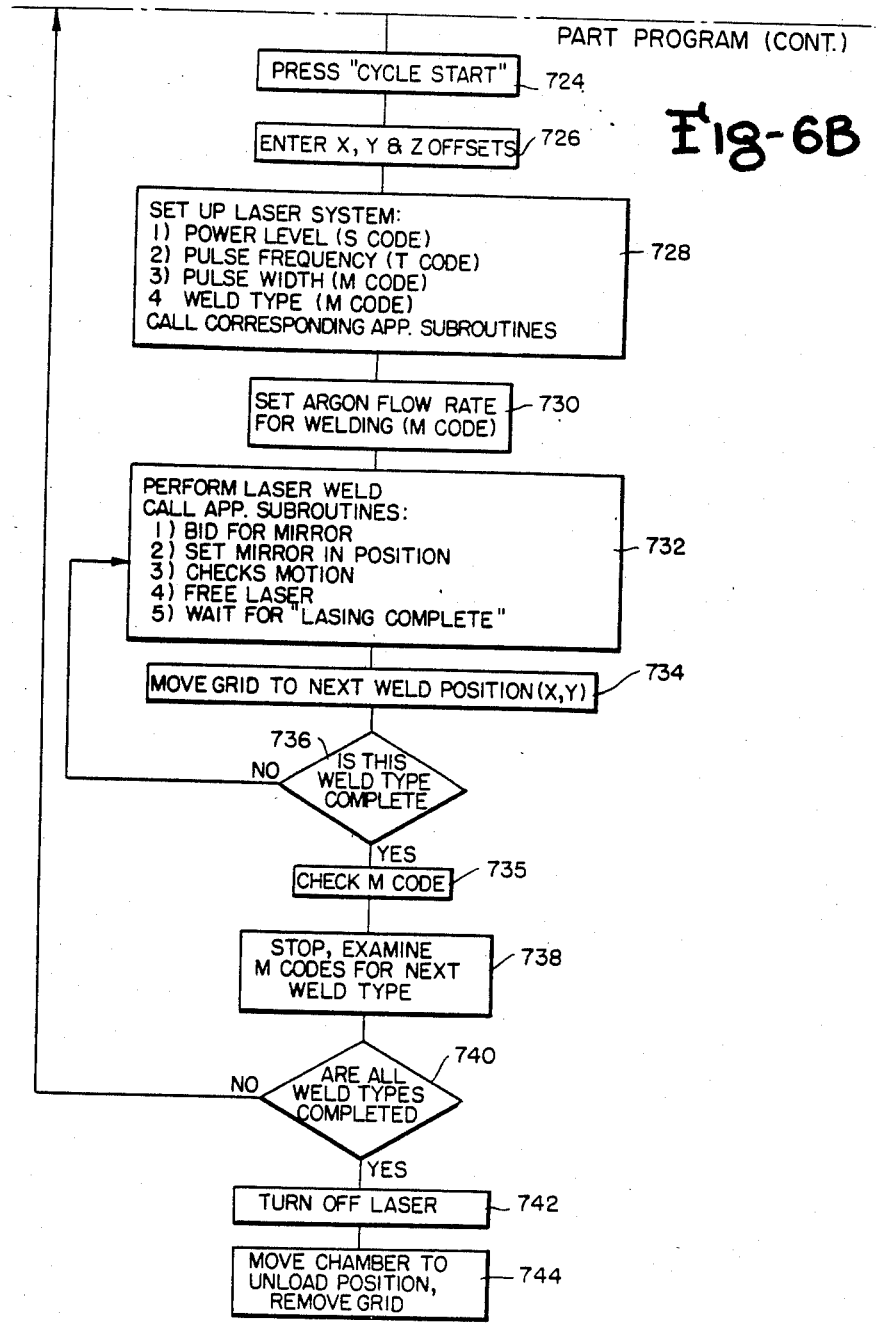

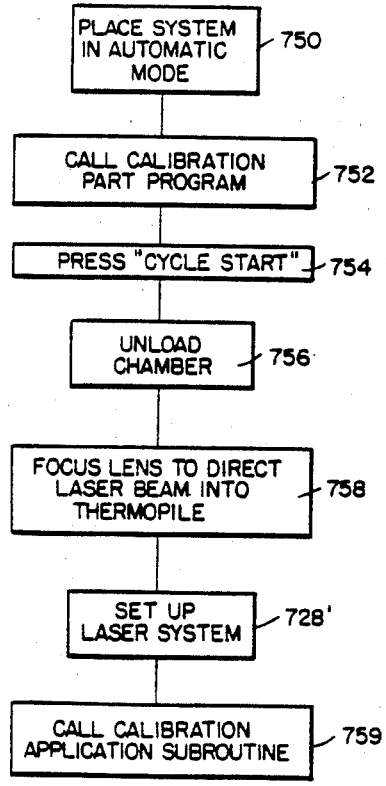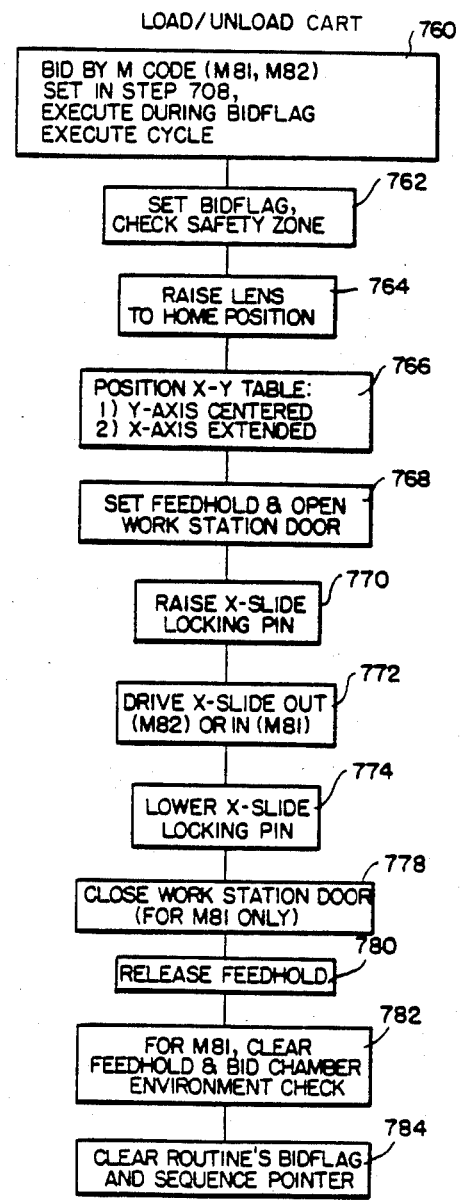

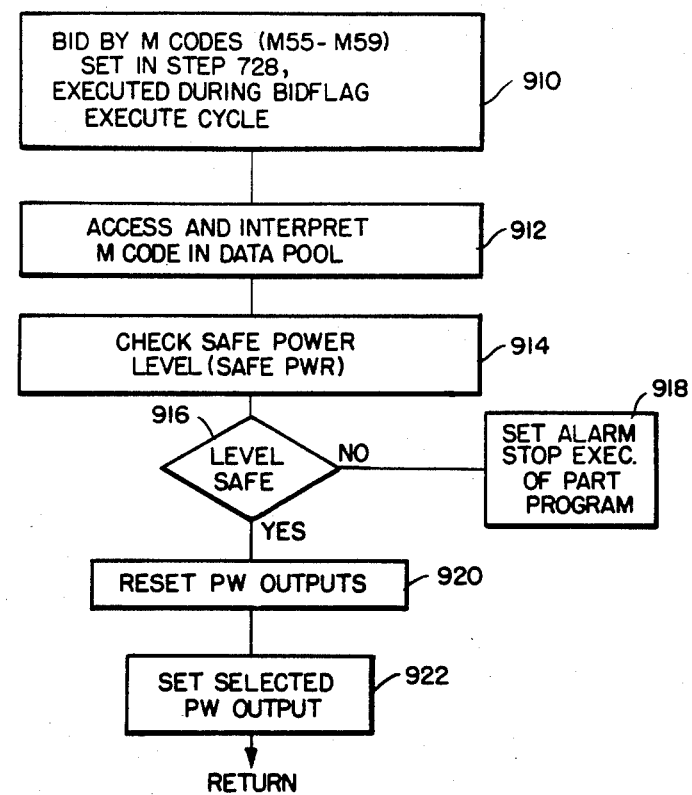

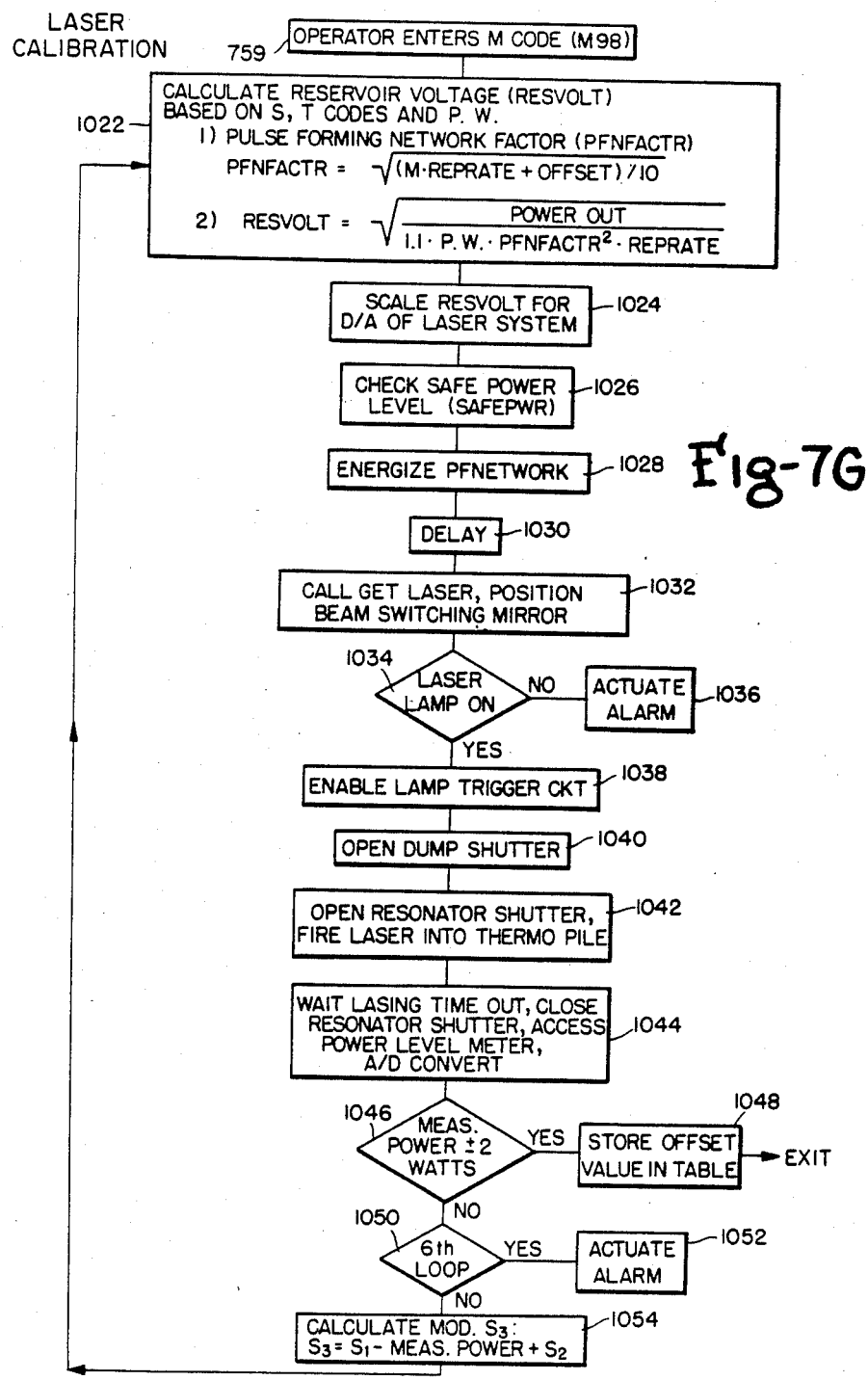

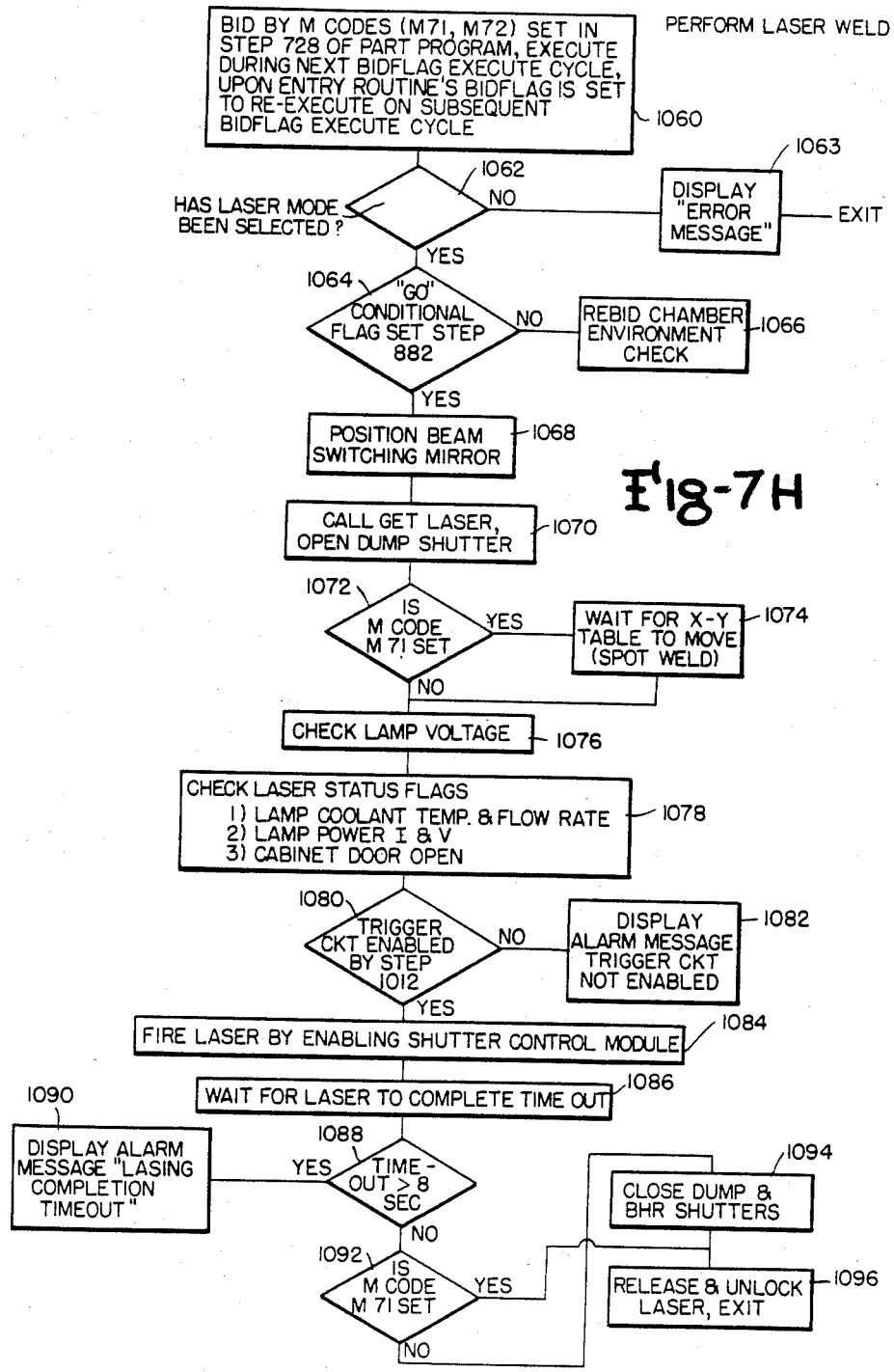

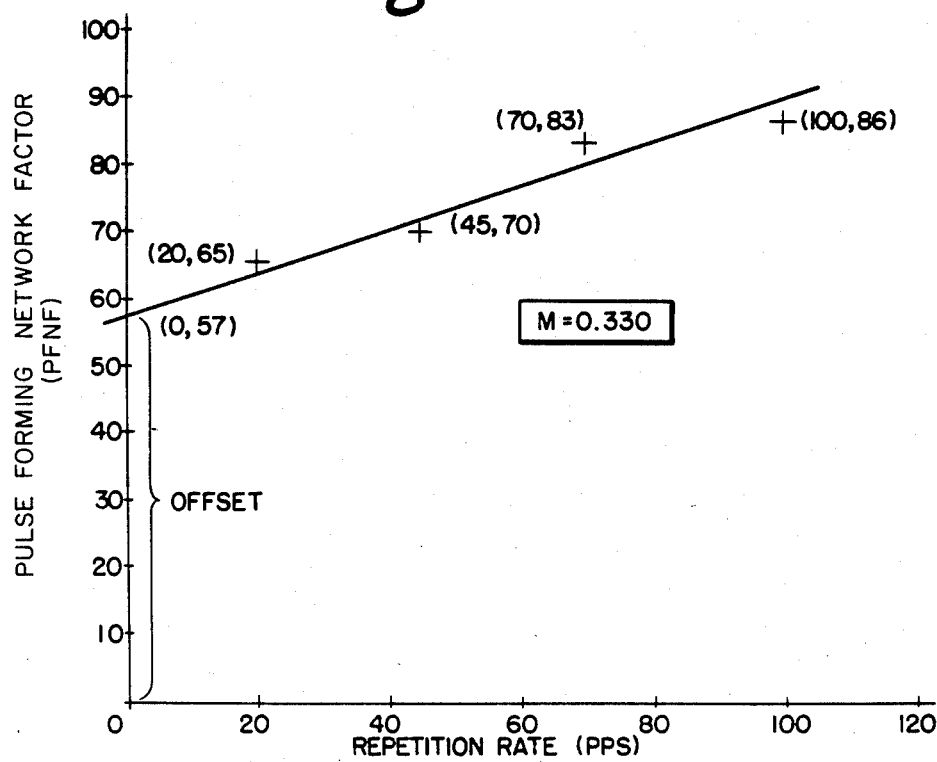

CALIBRATION OF AUTOMATED LASER MACHINING APPARATUS

CROSS-REFERENCE TO COPENDING APPLICATIONS

Attention is drawn to the following copending, commonly assigned applications, all/each filed on even date and incorporated specifically by reference into the instant specification:

(1) "FUEL GRID WITH SLEEVES WELDED IN NOTCHED GRID STRAPS" by R. Duncan, Ser. No. 414,232;

(2) "PULSED LASER MACHINING APPARATUS" by R. A. Miller and G. D. Bucher, Ser. No. 414,264;

(3) "APPARATUS AND METHOD FOR LASER MACHINING IN NON-REACTIVE ENVIRONMENT" by R. A. Miller and G. G. Lessman, Ser. No. 414,242;

(4) "STRAP AND VANE POSITIONING FIXTURE FOR FUEL ROD GRID AND METHOD" by R. F. Antol, R. W. Kalkbrenner and R. M. Kobuck, Ser. No. 414,197;

(5) "GRID ASSEMBLY FIXTURE, RETENTION STRAP AND METHOD" by R. M. Kobuck and R. W. Kalkbrenner, Ser. No. 414,198;

(6) "LASER MACHINING SYSTEM" by D. L. Wolfe, J. W. Clements and J. S. Kerrey, Ser. No. 414,241;

(7) "MOVABLE MACHINING CHAMBER WITH ROTATABLE WORK PIECE FIXTURE" by R. F. Antol, R. Kalkbrenner and D. L. Wolfe, Ser. No. 414,263;

(8) "WORKPIECE GRIPPING AND MANIPULATING APPARATUS FOR LASER WELDING SYSTEMS AND THE LIKE" by R. Kalkbrenner and R. Kobuck, Ser. No. 414,262;

(9) "LASER LENS AND LIGHT ASSEMBLY" by R. Antol, R. Kalkbrenner and R. Kobuck Ser. No. 414,205;

(10) "WELDING PLATES FOR A FUEL ROD GRID" by R. M. Kobuck, R. Miller, R. W. Kalkbrenner, J. Kerrey and R. Duncan, Ser. No. 414,265;

(11) "PLURAL COMPUTER CONTROL FOR SHARE LASER MACHINING" by J. W. Clements and W. D. Lanyi, Ser. No. 414,204;

(12) "GRID AND SLEEVES WELDING FIXTURE AND METHOD" by J. S. Kerrey and R. Duncan, Ser. No. 414,203; and

(13) "RIGID SUPPORT FOR LASER MACHINING APPARATUS" by D. L. Wolfe, Ser. No. 414,191.

BACKGROUND OF THE INVENTION

1. Field of the Invention

This invention, in its preferred form, relates to computer control of a plurality of lasing steps on a work piece and more particularly to such computer control for using a laser beam to carry out a sequence of machining steps on a work piece, wherein the parameters of generating the laser beam are automatically controlled as to the desired step and its mode. More particularly, this invention relates to computer control for laser machining that is calibrated to vary the power level of the generated laser beam in accordance with the desired mode, the set of laser parameters, and as a function of the measured power of the laser beam as directed onto the work piece. In an illustrative embodiment of this invention, the calibrated, computer control effects a series of welds on a work piece in the form of a nuclear fuel rod assembly made of a volatile metallic material such as the zirconium alloy known as Zircaloy.

2. Description of the Prior Art

The precision laser welding apparatus of this invention relates generally to the manufacture of nuclear fuel bundle assemblies 10 as shown in FIG. 1 of the drawings. As shown, the nuclear fuel bundle assembly 10 is a self-contained unit comprised of a top nozzle assembly 12 and a bottom nozzle assembly 14, between which is disposed a matrix of nuclear fuel rods 18 arrayed in rows and columns and held in such configuration by a plurality of fuel rod grids 16. Though not shown in FIG. 1, control rods are included at selected positions within the array of nuclear fuel rods 18. The assemblies 12 and 14 and the fuel rod grids 16 provide a skeletal frame to support the fuel rods 18 and the control rods. The nuclear fuel bundle assemblies 10 are loaded into predetermined locations within a nuclear reactor and, therefore, the orientation of the fuel rods 18 with respect to each other is rigorously controlled.

The precision laser welding apparatus of this invention is, in one illustrative embodiment thereof, related to the manufacture of fuel rod grids 16 as shown in FIGS. 2A to 2E. The fuel rod grid 16 is of an approximately square configuration, whose periphery is formed by four outer grid straps 22. Each end of an outer grid strap 22 is welded by a corner seam weld 30 to the end of a perpendicularly disposed outer grid strap. A plurality of inner grid straps 20 is disposed in rows and columns perpendicular to each other, whereby a plurality of cells are formed to receive the control rods and the nuclear fuel rods 18. The inner grid straps 20 disposed along the rows and columns have complementary slots therein at each of the points 24 of intersection for receiving a perpendicularly disposed inner grid strap 20. An intersect weld 32 is formed at each of the points 24 of intersection, whereby a rigid egg crate structure is formed. Further, each of the inner grid straps 20 includes at each end a pair of tabs 26 of a size and configuration to be tightly received in either a top or bottom row of slots 28 formed in the outer grid straps 22, as shown in FIG. 2A. A slot and tab weld 34 is effected along the top and bottom rows formed by the slots 28 within the outer grid straps 22. Further, a plurality of guide sleeves 36 is disposed on the sleeve side surface of the fuel rod grid 16 to receive and guide the control rods disposed therein. A series of notch seam welds 40 securely attaches the guide sleeves 36 to corresponding notches 38 formed within the inner grid straps 20. The precision laser welding apparatus of this invention is particularly adapted to perform a series of controlled welding operations whereby each of the welds 30, 32, 34 and 40 is carried out. The precision laser welding apparatus of this invention not only controls the various parameters of generating the laser in terms of the pulse width, the pulse height of each laser pulse, and the number of pulses to be applied to each weld, but also controls the sequential positioning of the fuel rod grids 16 with respect to the laser beam. It is understood that after each such weld, the fuel rod grid 16 is repositioned and/or the focal point of the laser beam changed to effect the particular type of weld desired.

Referring now to FIGS. 2B and 2C, the plurality of resilient fingers 44 is disposed longitudinally of the inner grid straps 20 in a parallel relationship to each other. A pair of spacing fingers 46 is disposed on either side of a corresponding resilient finger 44 and serves along with the resilient finger 44 to provide a resilient grip of the nuclear fuel rods 18 that are disposed within the cell formed by the intersecting inner grid straps 20. A resilient finger 44a is disposed to the right as seen in FIG. 2C in an opposing relationship to the spacing finger 46a, whereby a nuclear fuel rod 18 is resiliently held therebetween.

The manner of assembling the inner grid straps 20 to each other as well as to the outer grid straps 22 is shown in FIG. 2D. Each of the inner grid straps 20 includes a plurality of complementary slots 52. An upper grid strap 20a has a downwardly projecting slot 52a, whereas a lower grid strap 20b has a plurality of upwardly oriented slots 52b of a configuration and size to be received within a corresponding slot 52a of the inner grid strap 20a. At each end of the inner grid strap 20, there is disposed a pair of the tabs 26 to be disposed within corresponding slots 28 of an outer grid strap 22.

As will be explained in detail later, the inner grid straps 20 are welded to each other by the intersect welds 32 as formed of projection tabs 48 and tab portions 50a and 50b. More specifically, a projection tab 48 is disposed between a corresponding set of tab portions 50a and 50b when the inner grid straps 20a and 20b are assembled together. Upon the application of a laser beam to the tab 48 and tab portions 50a and 50b, an intersect weld 32 is formed that is rigidly strong and free of contamination in accordance with the teachings of this invention. Further, each end of an outer grid strap 22 has a corner tab 54. As shown in FIG. 2D, the outer grid straps 22c and 22b have respectively corner tabs 54b and 54c that overlap each other and are seam welded together to form the corner seam weld 30.

The vanes 42 project, as seen in FIGS. 2C and 2E, from a vane side of the fuel rod grid 16 to enhance the turbulence of the water passing over the nuclear fuel rods 18. Further, as illustrated particularly in FIG. 2C, the guide sleeves 36 are aligned with cells formed by the inner grid straps 20 that are free of either a resilient finger 44 or spacing finger 46, to thereby permit the free movement of the control rod through the cell and through the guide sleeve 36.

U.S. Pat. No. 3,966,550 of Foulds et al., and U.S. Pat. No. 3,791,466 of Patterson et al., assigned to the assignee of this invention, disclose similarly configured fuel rod grids of the prior art. Each of these patents discloses a fuel rod grid, wherein the inner and outer grid straps are made of a suitable metallic alloy such as Inconel, and the above identified interconnections are effected by furnace brazing. However, the zirconium alloy Zircaloy is known to have the desirable characteristic of a low neutron absorption cross section which allows for more efficient use of the nuclear fuel in the utility operation and therefore allows for a longer elapsed time between refueling by the replacement of the nuclear fuel bundle assemblies. In particular, fuel rod grids made of Zircaloy have a lower absorption rate of the neutrons generated by the fuel rods than that absorption rate of straps made with Inconel. The making of the grid straps of Zircaloy requires at least several changes in the assembly of the fuel rod grids. First, it is necessary to make the slots, whereby the inner grid straps may intersect with each other, of looser tolerances in that grid straps made of Zircaloy do not permit a force fitting thereof, i.e. to be hammered into position, but rather require controlled fit-up to allow "push-fits" of the intersecting grid straps. In addition, Zircaloy grid straps may not be brazed in that heating Zircaloy to a temperature sufficient to melt the brazing alloy would anneal the Zircaloy, resulting in a loss of mechanical strength.

Prior to the selection of a particular method of welding, several different methods of welding volatile materials such as Zircaloy were investigated including continuous welding with a $CO_2$ laser, pulsed emission of a Nd: YAG laser, gas tungsten arc welding and electron beam welding. A pulsed electron beam is capable of power densities of up to $10^9$ watts/square centimeter with pulse widths in the micro-second and low millisecond range. However, welding with an electron beam is typically carried out in a vacuum environment which is relatively expensive to build and requires a relatively long time to establish the desired degree of vacuum therein, thus slowing down the manufacture of the fuel rod grids. Further, it is necessary to obtain relative movement of the work piece, e.g. the fuel rod grids, in three dimensions with respect to the electron beam which would require a very complex grid positioning system. The use of a continuous electron beam provides relatively low levels of power (in the order of 200 watts) requiring relatively long welding times and providing very shallow weld penetrations. The use of a gas tungsten arc was also considered and proved to be unacceptable for providing a sequence of welds in that after a given number of welds, e.g. 25, the arc electrodes require sharpening to provide the desired fine arc to produce numerous well-defined welds and to avoid damaging adjacent grid straps or vanes of the fuel rod grids. Two types of lasers are commonly used for welding applications: (1) the solid state Nd:YAG laser, which uses a crystal rod of neodynium doped yttrium-aluminum-garnet and (2) the $CO_2$ laser, which uses a mixture of $CO^2-N_2$-He as the lasing medium. An inherent advantage of the Nd:YAG laser is that its emission is in the order of 1.06 micron wave lengths, where glass is transparent to its laser emission. This charateristic permits the use of a coaxial microscope which uses the same optic elements for both optical viewing and laser focusing. Further, a pulsed Nd:YAG laser is capable of 400 watts of average power, of a pulse frequency of up to 200 pulses per second and of a peak power in excess of 8000 watts for up to 7 milli-seconds. Such high peak power permits the Nd:YAG laser to produce welds of relatively deep penetration, thus insuring the structural security of welded straps of the nuclear fuel rod grids. Such lasers may be operated from a "cold start" with its shutter remaining open, whereby the weld time is determined by the length of time the power is applied to its flash lamps. Such a method of welding is not particularly applicable to a series of relatively rapid welds due to the laser rod warm-up time for each weld in the order of 0.8 seconds. Further, optical path length changes occur until a condition of thermal equilibrium is attained within the laser rod. A second method of operation of the Nd:YAG laser permits the continuous pulse operation of the laser while using its shutter to "pick off" a fixed number of pulses, thus eliminating the effects of laser warm-up and ensuring a uniformity of welds even though a great number of such welds are being effected.

U.S. Pat. No. 3,555,239 of Kerth is an early example of a large body of prior art disclosing automated laser welding apparatus in which the position of the work piece, as well as the welding process, is controlled by a digital computer. Kerth shows the control of laser beams while controlling the work piece as it is moved from side to side along an X axis, horizontally forward and backward along a Y axis and vertically up and down along a Z axis. Typically, pulse drive motors are energized by the digital computer to move the work piece rectilinearly along a selected axis. In addition, the welding is carried out within a controlled atmosphere and, in particular, the pressure and flow of gas into the welding chamber is controlled by the digital computer. Further, a counter is used to count pulses whereby the number of laser pulses applied to the work piece may likewise be controlled.

U.S. Pat. No. 3,803,379 of McKay discusses the problem of maintaining the intensity of a laser beam at precise levels. In particular, this patent notes that when a work piece is changed, it is typically necessary to shut down the laser while a new work piece is being installed and thereafter, to start up the laser bringing it back to a desired level of intensity before resuming machining with its laser beam. In particular, the change of the laser beam intensity will effect corresponding changes in the machining effect on the work piece. To overcome this problem, U.S. Pat. No. 3,803,379 suggests that a diverter mechanism be incorporated along the path of the laser beam, whereby the laser beam may be diverted into a heat sink. Thus, while the work piece is being replaced, the diverter mechanism diverts the laser beam into the heat sink, thus allowing the laser to keep firing at a uniform rate without being shut down so that its temperature, once established under equilibrium conditions, will not be altered between machining operations. Further, experience has shown that with heavy laser usage, the intensity of the laser beam will attenuate with time due to aging of the laser itself as well as of the excitation lamps associated therewith. In addition, the laser beam upon striking a work piece typically throws off gaseous material and debris that may coat the work piece or the laser focusing lens, whereby the machining efficiency is attenuated. Thus it is necessary to periodically calibrate the laser system, whereby the energy level of the laser beam as imparted to the work piece may be accurately controlled. The McKay patent also discloses a relatively simple form of calibration, wherein a portion of the laser beam as directed onto the work piece is diverted by a partially silvered mirror disposed at a 45° angle with respect to the laser beam path, onto a transducer providing an electrical signal indicative of the power of the reflected portion of the laser beam. The transducer is in turn connected to a meter or indicator that provides a visual indication of the power of the reflected beam to permit adjustment or calibration of the strength of the laser beam as directed onto the work piece.

In the initial development of laser machining systems, lasers were employed for individual, low production machining operations. With the development of the art, laser systems were increasingly employed for high production work processing operations as would be controlled automatically by computers. As described above, such high production systems operate efficiently to reposition the work piece, whereby a sequence of welds or other machining operations may be rapidly performed. Under such demands of continuing excitation, laser life becomes a factor in terms of efficient operation and of cost of production. It is contemplated that under high usage where repeated welds are required, as for the production of the above described fuel rod grids, that laser life would be a significant factor to consider. Under heavy usage, the life expectancy of the laser head and, in particular, its excitation lamps would be in the order of several days, and after this life had been expended, it would be necessary to replace at least the lamps, as well as to calibrate the new laser system.

This invention to be described below is particularly directed toward the computer control of laser machining, wherein laser machining is effected in selected of a plurality of modes, each mode varying as to its lasing parameters. For example, in an illustrative embodiment of this invention, a laser source is excited to emit a series of laser pulses onto the work piece in the form of the nuclear fuel rod grid 16 as described above. The fuel rod grid 16 is machined, e.g. welded, with a variety of welds including the corner seam welds 30, the intersect welds 32, the slot and tab welds 34, and the notch seam welds 40. Each such type or mode of machining requires a different set of parameters in terms of the desired power imparted to effect the weld, the pulse rate of and the pulse width of the laser beam. As mentioned above, it is contemplated that the efficiency of the laser and more particularly its excitation lamps will attenuate rapidly with the heavy duty use contemplated by the teachings of this invention. Under such usage, experience has shown that it is necessary to replace the excitation lamps as often as every two days. In actual practice, it has been found necessary to adjust the power level of the laser beam effecting the noted welds at least as often as twice a day to ensure the intregrity of the produced welds. For example, calibration is performed at the beginning of the production day to adjust the laser power, and a second calibration is conducted at the end of the day as a check of the integrity of the welds made during the course of that day. As will be explained in detail below, a laser beam is emitted in each mode or weld type at a programmed power level, which is adjusted or calibrated as a function of the desired lasing parameters for that mode as well as a measurement of the actual power level of the laser beam as directed onto the fuel rod grid.

SUMMARY OF THE INVENTION

It is therefore an object of this invention to provide a new and improved computer control for effecting precision laser machining in accordance with a selected set of lasing parameters.

It is a more particular object of this invention to provide a new and improved computer control of a laser beam to carry out a sequence of precision lasing steps, wherein the intensity or power level of the laser beam is calibrated in accordance with the parameters of that lasing mode, as well as a measurement of the power of the laser beam.

It is a more particular object of this invention to provide a new and improved computer control for effecting a sequence of laser machining steps in accordance with selected modes or sets of lasing parameters, wherein the degree of laser excitation is calibrated for each set of parameters in accordance with a measurement of the power level of the laser beam.

In accordance with these and other objects of the invention, there is provided a computer controlled apparatus for controlling a sequence of machine steps utilizing a laser beam whose power level is adjusted in accordance with its parameters as a function of a measurement of the power level of the generated laser beam. The laser apparatus includes a laser source or rod for emitting a laser beam and means in the illustrative form of a laser lens assembly for focusing and directing the laser beam onto the work piece. The laser source is associated with excitation means in the form of lamps for pulse driving or exciting the laser rod to emit a like sequence of laser pulses, whose parameters, e.g. pulse width and frequency, are selectively varied and controlled. The power level of the laser beam is calibrated by first measuring the power level of the laser beam as directed onto the laser piece, and then by using the measurement of laser power to calibrate or to adjust the degree of lamp excitation.

In a particular embodiment of this invention, the excitation lamp or lamps are coupled to a pulse forming network that is energized by a "reservoir voltage" set to excite the laser source to emit a pulsed laser beam of the calibrated or desired power level. To effect calibration, the power level of the emitted laser beam is measured and is compared with the program power level corresponding to the applied reservoir voltage. If the measured power of the laser beam is within limits, there is no need to adjust the reservoir voltage. However, as the efficiency of the laser source and its excitation lamps attenuate with age and use, the power level will begin to differ from the programmed power level, thus necessitating an adjustment of the reservoir voltage. To this end, the reservoir voltage is adjusted, i.e. an offset is added to the initially programmed value of the power level as a function of the measured power. In an illustrative embodiment of this invention, the offset is taken as the difference of the measured and programmed power levels. A new reservoir voltage is calculated as a function of the adjusted or calibrated power and that reservoir voltage is applied to the pulse forming network to generate a new laser beam whose power level is measured and compared with the desired or programmed level. This reiterative process is repeated until divergence is achieved, i.e. the measured power level is within limits.

Once divergence has been achieved, the off set is stored in the computer's memory. In particular, the offset is used to calculate an array or table of offsets for each of the laser machining modes. For example, the work piece to be machined or welded includes four different types of welds each with its own distinct parameters in terms of power level, frequency and pulse width. A set of calculations are carried out by the computer to calculate for each mode the reservoir voltage to be applied for that mode to the pulse forming network as a function of the offset and the lasing parameters for that mode. Thus, in the course of the machining the work piece, a plurality of laser machining steps of selected modes is carried out under the control of the computer. When a change of mode is made, the table in memory is addressed in accordance with the new mode to read out the corresponding reservoir voltage, which is applied to energize the pulse forming network, whereby the emitted laser beam is of an adjusted, calibrated power level for the selected mode.

BRIEF DESCRIPTION OF THE DRAWINGS

A detailed description of a preferred embodiment of this invention is hereafter made with specific reference being made to the drawings in which:

FIG. 1 is a perspective view of a nuclear fuel bundle assembly incorporating a plurality of grids made in accordance with the teachings of this invention;

FIGS. 2A–2E are respectively a perspective view, a plan view, a sectioned side view, a perspective exploded view, and a plan view of a fuel rod grid made in accordance with the teachings of this invention and incorporated into the assembly of FIG. 1;

FIG. 4 is a perspective, schematic representation of the laser system as incorporated into the precision laser welding apparatus for directing on a time shared basis a laser beam emitted from a single laser source to each of two work pieces, e.g. nuclear fuel rod grids;

FIGS. 5A and 5B form a schematic diagram of the computer implemented control system for the laser welding system showing the relationship of the interface circuits with respect to the central processor unit (CPU) and memory, and to each of the chamber positioning mechanisms, of a second like computer control system, of the laser system, of the argon supply system, of the vacuum exhaust system, of the B axis rotation drive, of the oxygen analyzer, of the moisture analyzer and of the thermopile;

FIGS. 6A and 6B are a high level, flow diagram of the part program illustrating the steps of the control process whereby the laser welding system is controlled to effect a series of welds of the nuclear rod grid in a precise fashion; and FIGS. 7A to 7I are application routines that are bid by M, S, and T codes set in part by the part program of FIGS. 6A and 6B, and, in particular are respectively the CALIBRATION part program, the LOAD/UNLOAD CART application subroutine, the SET LASER PULSE WIDTH application subroutine, the SERVICE S CODE application subroutine, the SERVICE T CODE application subroutine, the SET LASER POWER LEVEL OFFSET application subroutine, the LASER CALIBRATION application subroutine, the PERFORM LASER WELDS application, and the CHECK SAFE POWER LEVEL application subroutine, and FIG. 7K is a curve defining the characterizing parameters of the laser pulse forming network.

DESCRIPTION OF THE PREFERRED EMBODIMENT

Figure 3A:
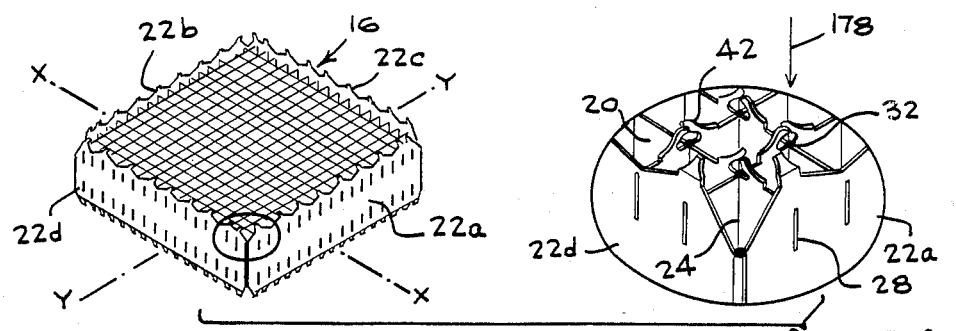
FIGS. 3A–3L show in a series of perspective views the sequence of steps for welding the nuclear rod grid as shown in FIG. 2.

The fuel rod grids 16 are comprised as described above of the inner and outer grid straps 20 and 22 that are assembled and welded together as shown in FIGS. 2A to 2E. Each of the grid straps 20 and 22 is punched from a continuous roll of slit material and accumulates some surface oil in the punching operation. The oil film is cleaned and thereafter, the strap is annealed and then assembled into a work fixture as described in copending application entitled "GRID ASSEMBLY FIXTURE, RETENTION STRAP AND METHOD" Ser. No. 414,918. Thereafter, the grid 16 and fixture are welded by the laser welding system 100 of this invention which carries out each of the intersect welds 32, the corner seam welds 30, the slot and tab welds 34, and the notch seam welds 40 in a pure atmosphere of an inert gas. Referring now to FIGS. 3A to 3L, the sequence of the welding steps in the inert gas is described in accordance with the teachings of this invention. The laser welding system 100 will be described in detail later; it is believed that an understanding of the manner in which the work piece, i.e. the fuel rod grid 16, is manipulated in each of three dimensions will facilitate an understanding of the operation of the laser welding system 100. As is apparent from these drawings, the fuel rod grid 16 is incrementally moved along its X and Y axes within a plane and is selectively rotated about its Y axis. Significantly, the aforementioned motion is carried out within a chamber wherein the atmosphere of the inert gas is maintained to a high degree of purity. The first step is illustrated in FIG. 3A, wherein the fuel rod grid 16 is disposed within the controlled atmosphere as formed by the welding chamber with its vanes 42 extending upwardly. A welding fixture is described in the copending application entitled "WELDING PLATES FOR A FUEL ROD GRID" Ser. No. 414,265 whereby the inner and outer grid straps 20 and 22 are fixedly disposed with respect to each other during the welding operations. A vane suppressor fixture is a tool that is used for deflecting the vanes 42, whereby the vanes are fitted within the welding fixture; the vane suppressor fixture is described in the copending application entitled "STRAP AND VANE POSITIONING FIXTURE FOR FUEL ROD GRID AND METHOD" Ser. No. 414,917. The atmosphere is purified by directing argon gas into the welding chamber until the desired degree of purity is reached, i.e. 10 ppm of water and 7 ppm oxygen. When the pure atmosphere has been established, the fuel rod grid 16 is moved in a series of incremental movements along the X and Y axes, whereby each of the points 24 of intersection between inner grid straps 20 is aligned with a laser beam 178 an thereafter, a controlled amount of energy is imparted thereto to effect the intersect weld 32. As will be explained in detail later, the laser beam 178 is provided by a pulsed Nd:YAG laser that is excited by pulsed excitation lamps energized by a calibrated reservoir voltage to deliver a specified level of energy to the grid 16. In particular, the number of pulses directed onto the point 24 of intersection of the inner grid straps 20 is controlled so that six pulses of the laser beam are directed onto the work piece to form the intersect weld 32, each pulse having a pulse width of 6.2 ms, a rate of 20 pulses per second (pps), an average power of 350 watts and a peak power of 2,580 watts. The intersect welds 32 are formed by turning on the laser beam 178 when the fuel rod grid 16 has been disposed in an aligned position with respect to the laser beam 178.

Figure 3B:
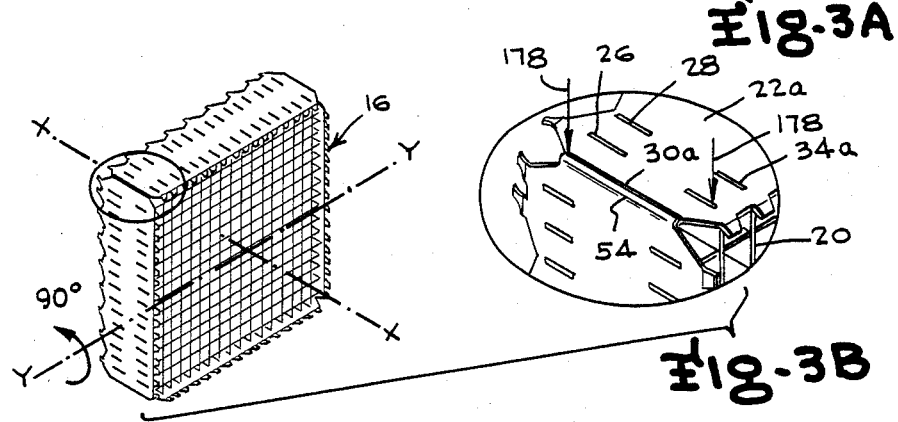

The next step is shown in FIG. 3B, wherein the fuel rod grid 16 is rotated about its Y axis 90° by a mechanism to be explained, whereby a first set of the slot and tab welds 34 and a first corner seam weld 30 are performed. These welds are seam welds which are carried out by moving the fuel rod grid 16 along its X axis while directing the laser beam 178 onto the work piece. In an illustrative embodiment of this invention, the slot and tab welds 34, as well as the corner seam welds 30 are effected with a laser beam 178 of a pulse width of 2.2 ms, a pulse frequency of 50 pps, and an average of 350 watts, with the fuel rod grid 16 being moved at a rate of 30 inches per minute (IPM). FIG. 3B shows the relative position of the laser beam 178 to effect each of the slot and tab welds 34a and the corner seam weld 30a.

Figure 3C:
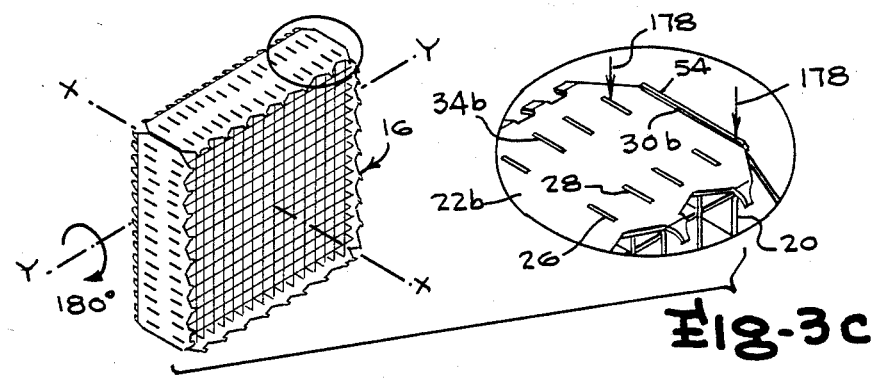
Figure 3D:
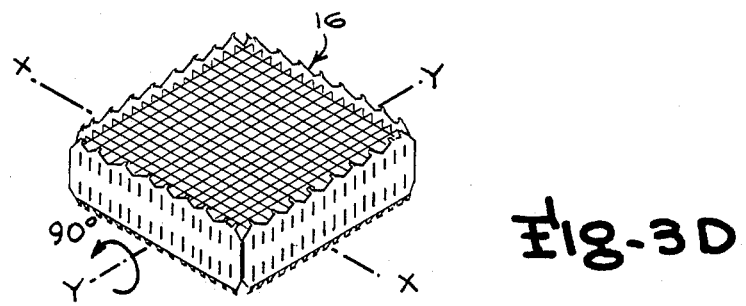

Next, as shown in FIG. 3C, the fuel rod grid 16 is rotated in a clockwise direction so that the opposing outer grid strap 22b is aligned with respect to the laser beam 178, whereby a second set of slot and tab welds 34b and a second corner seam weld 30b may be carried out. Thereafter, as shown in FIG. 3D, the fuel rod grid 16 is rotated 90° counter-clockwise to its original position as shown in FIG. 3A, and the fuel rod grid 16 and its weld fixture are removed from the welding chamber.

Figure 3E:
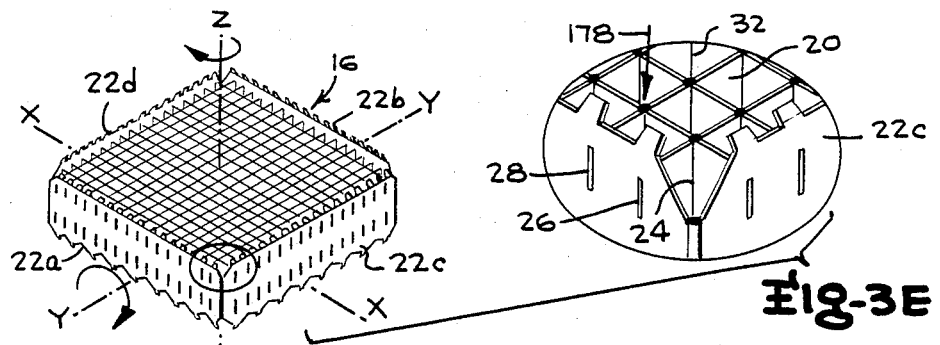
Figure 3F:
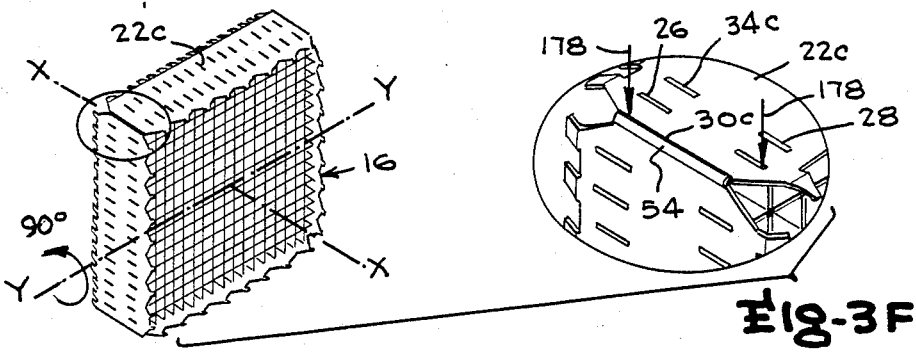
Figure 3G:
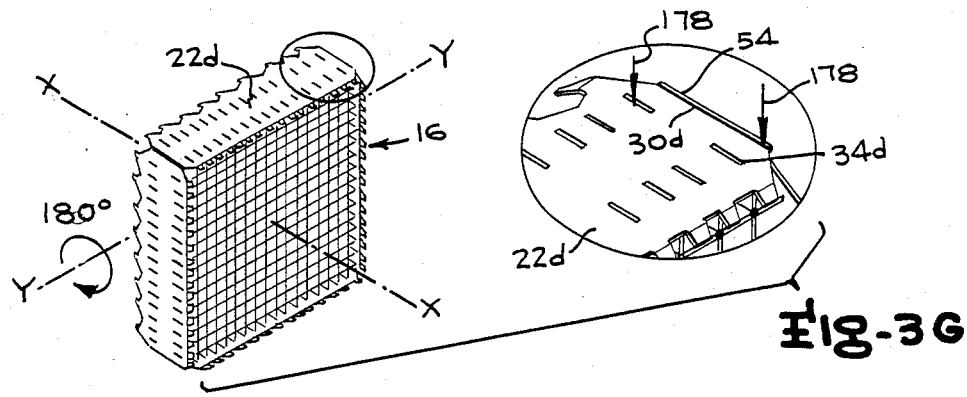
Figure 3H:
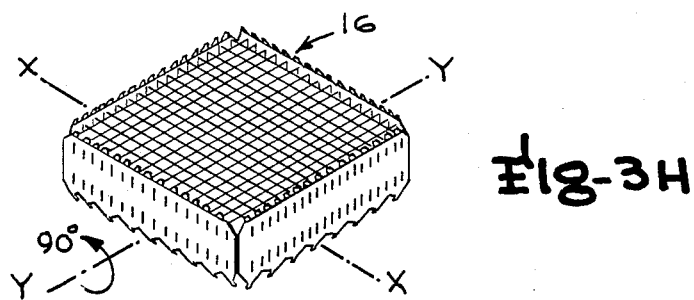
Figure 3I:
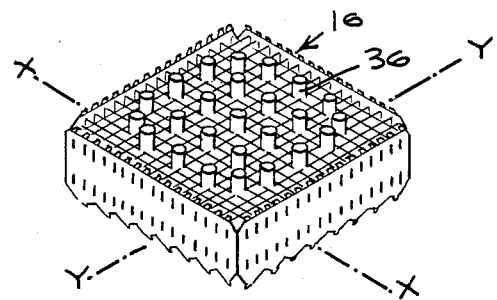

As shown in FIGS. 3E to 3H, a similar set of welding steps are carried out. After removal from the chamber, the fuel rod grid 16 and its weld fixtures are turned over to dispose its vane side down and are rotated about its Z axes 90° in clockwise direction so that the unwelded outer grid strap 22c faces the door of the welding chamber. The grid 16 and its weld fixture are locked into a secure position with respect to the welding chamber and the laser beam. Initially, the air within the welding chamber is purged with argon gas to an acceptable level of purity. Thereafter, as shown in FIG. 3E, the fuel rod grid 16 is incrementally moved through a series of steps along the X and Y axes, whereby each of the intersect welds 32 is effected as described above. After the completion of the intersect welds 32, the fuel rod grid 16 is rotated 90° in a counter-clockwise direction about its Y axis so that its outer grid strap 22c is brought beneath the laser beam 178, whereby a third set of slot and tab welds 34c is carried out and a third corner seam weld 30c effected. Next, as shown in FIG. 3G, the fuel rod grid 16 is rotated 180° about its Y axis to present the fourth outer grid strap 22d to the laser beam 178, whereby a fourth set of slot and tab welds 34d and a fourth corner seam weld 30d may be carried out. Thereafter, in the step as shown in FIG. 3H, the fuel grid 16 is rotated 90° in a counter-clockwise direction to its original position before it and its weld fixture are removed from the welding chamber.

Figure 3J:
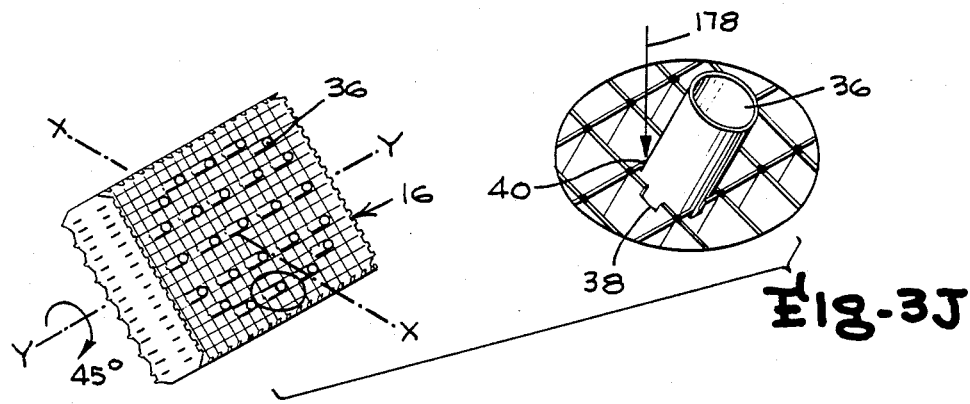
Figure 3K:
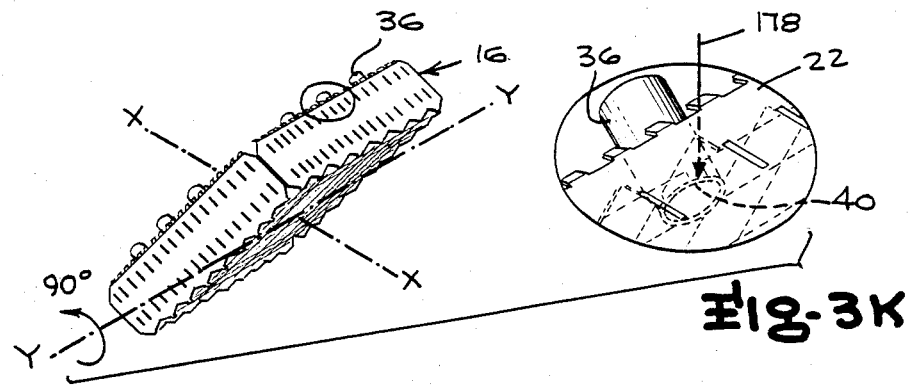
Figure 3L:
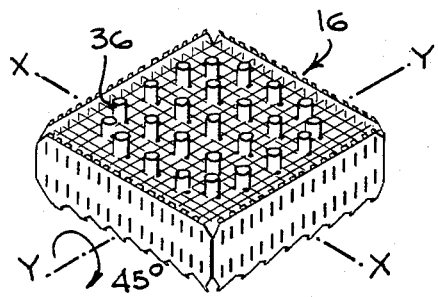

Referring now to FIGS. 3I to 3L, there is shown the process by which the guide sleeves 36 are welded to the fuel rod grid 16. Initially, the fuel rod grid 16 is removed from its welding fixture as required for the steps in FIGS. 3A to 3H and placed into a sleeve welding fixture as described in the copending application entitled "FUEL GRID WITH SLEEVES WELDED IN NOTCHED GRID STRAPS" Ser. No. 414,232, the sleeve welding fixture includes a plurality of fixture pins disposed through selected of the cells formed by the inner grid straps 20 for receiving the guide sleeves 36, i.e. those openings having the notches 38 disposed in the peripheral edges thereof as seen in FIG. 3J. In particular, the fixture pins accurately position the guide sleeve 36 so that its axis is disposed centrally of and parallel with the surfaces of the inner grid straps 20. With the guide sleeves 36 accurately aligned and assembled with respect to the fuel rod grid 16, the grid 16 and its sleeve welding fixture are disposed into the welding chamber and affixed with respect to the chamber and to the laser beam 178. Thereafter, the air is purged with argon gas to the desired level of purity. Thereafter, as shown in FIG. 3J, the fuel rod grid 16 is rotated 45° in a counter-clockwise direction and thereafter the grid and sleeve welding fixture is locked into that position at 45° with respect to the path of the laser beam 178 as shown in FIG. 3J. Thereafter, a series of notch seam welds 40 is carried out at a pulse width of 6.2 ms, at a pulse frequency of 20 PPS, an average power of 255 watts and at a welding speed of 10 IPM. The fuel rod grid 16 is moved along the Y axis at the noted rate while the laser beam 178 is pulsed. As will be explained in detail later, it is necessary to refocus the laser beam 178 for each horizontal row of guide sleeves 36 as shown in FIG. 3J. A series of notch seam welds 40 is effected by moving the fuel rod grid 16 along its Y axis bringing each guide sleeve 36 into position with respect to the laser beam 178, turning on the laser beam to effect the notch seam weld 40, and thereafter moving the fuel rod grid 16 to align the next guide sleeve 36. After a single horizontal row of guide sleeves 36 has been welded, the fuel rod grid 16 is moved along its X axis to position the next row of guide sleeves 36 in alignment with respect to the laser beam 178. Thereafter, it is necessary to refocus the laser beam 178 to effect the notch seam welds 40. As seen in FIGS. 3J and 3K, the guide sleeve 36 fits into four notches 38, and notch sea welds 40 are effected on opposing sides of the guide sleeves 36.

After one side of the guide sleeve 36 has been welded, it is necessary to rotate the grid 16 90° in a counter-clockwise direction as shown in FIG. 3K to expose the other, opposing notch 38 to the laser beam 178. After rotation, a series of notch seam welds 40 is carried out as explained above. Finally, in step FIG. 3L, the fuel rod grid 16 is rotated 45° in a clockwise direction to its original position before the grid 16 and its sleeve welding fixture are removed from the welding chamber to complete the welding steps of the fuel rod grid 16.

The laser system 102 is shown in FIG. 4 and may, in one illustrative embodiment of this invention, take the form of that laser system manufactured by Raytheon under their model designation number SS500. The laser system 102 includes a laser rod 170 illustratively taking the form of a Nd:YAG crystal laser and a pair of linear krypton flash lamps disposed in a high efficiency, laser head. The laser head includes a total reflecting mirror 182 and a partial reflecting mirror 184 disposed on either end of the laser rod 170. An innercavity shutter 188 is disposed between the laser rod 170 and the total reflecting mirro 182 and is selectively controlled to release a selected number of lasing pulses, whereby the energy imparted to effect laser welding may be precisely controlled in a manner to be explained below. The laser head is modularly constructed to permit all optic elements thereof including the laser rod 170, the excitation lamps 186, and the mirrors 182 and 184 to be easily and independently replaced. The excitation lamps 186 shall be quickly replaced without disturbing the optical alignment. Further, the excitation or flash lamps 186 are water cooled over their entire length, including their end connectors. Lamp triggering provides for parallel pulsing of the excitation lamps 186 by energizing the cavity. The laser rod 170 shall illustratively be selected such that 400 watts average power is obtained at the work piece with the input power to the pulse forming network not to exceed 18 KW when operating at pulse widths of 6 ms and 2 ms and pulse rates of 20 Hz and 50 Hz respectively. A dump shutter 190 is disposable in a first position to direct the laser beam 177 along a diverted path 196 into a beam absorber 194 during those periods in which the work pieces in the form of the fuel rod grids 16 are being changed within the chambers 108. An actuating mechanism 192 is shown for disposing the shutter 190 from its first beam intercepting position to a second position, wherein the beam 177 is focused by a beam expander lens assembly 198 to a beam directing mechanism comprised of the movable beam switching mirror 172 and the stationary mirror 174. When the reflective mirror 171 is disposed to intercept the laser beam 177, it is diverted along path 178a to the vertically directing mirror 176a to be directed vertically. The laser focusing lens assembly 204a intercepts and focuses the laser beam 178a onto the fuel rod grid 16 within the chamber 108a. As shown, the laser focusing lens assembly 204 includes a lens 202 and a lens carrier tube 200 as rectilinearly positioned by the Z-axis laser assembly 222. When the reflecting mirror 172 is rotated by the motor 175 from a position intercepting the laser beam 177, it is diverted by the stationary reflective mirror 174 to form the laser beam 178b, as directed by the vertically directing mirror 176b towards the welding chamber 108b.

The excitation lamps 186 are energized by a power supply illustratively comprising a voltage regulated DC power supply which charges a pulse forming network (PFN) through a charging inductor. A computer control system 124 as shown in FIG. 5 controls laser emission by alternatively closing switches (silicon controlled rectifiers) that charges the PFN from the DC power supply reservoir capacitator bank and discharges the PFN into the excitation lamps 186 to thereby excite the laser rod 170 to emit a series of laser pulses. The method and apparatus for controlling the emission of laser pulses from the laser rod 170 is fully described in copending application, entitled "PULSE LASER MACHINING APPARATUS" Ser. No. 414,264. The excitation lamps 186 shall operate in a "simmer" mode of operation, in which the lamps 186 are operated at a low DC current level below lasing threshold, and high current pulses are superimposed on the simmer current for generating laser pulses. The PEN shall provide pulses of 2 ms and 6 ms.

To assist in the initial alignment of the weld chamber 108 and, in particular, the fuel rod grid 16 with respect to the laser beam 178, there is provided means for sighting the grid 16 and, in particular, to determine its exact position with respect to laser beam 178 in the form of an alignment TV camera 206 that is aligned to establish an image path 214 coinciding with the path of the laser beam 178a. As shown in FIG. 6, the image path 214 is focused by a lens 210, selectively passed by a Bureau of Radiological Health (BRH) or safety shutter 212 and directed through the partially transmissive mirror 176 to the TV camera 206. The lens 202, in addition to focusing the laser beam 178 onto the fuel rod grid 16, also focuses with the assistance of lens 210 the image of the grid 16 onto the TV camera 206. The laser focusing lens assembly 204 also includes an illuminating lamp that is selectively energized to illuminate the grid 16 for alignment purposes. The BRH shutter 212 is selectively opened and closed to permit alignment of the grid 16 with respect to the laser beam 178, remaining closed during all other periods as a safety measure. The laser lens assembly 204 diagrammatically shown in FIG. 4, is fully disclosed in the copending application entitled "LASER LENS AND LIGHT ASSEMBLY" Ser. No. 114,205.

As illustrated in FIG. 4, each of the welding chambers 108 may be moved from a first, welding position as shown in the dotted line to a second, out position. When the welding chamber 108 is in its first position, the laser beam 178 is directed by its vertically directing mirror 176 onto a power measuring device or thermopile 218, as supported within a shield tube 216. The shield tube 216 is mounted on a rearward portion of the welding chamber 108 and includes a restricted opening 220 whereby the laser beam 178 may be effectively confined within the shield tube 216. Periodically, the welding chamber 108 is disposed to its second, out position and the laser beam 178 is directed onto the thermopile 218 to provide an indication of the power output of the laser rod 170 actually impinging onto the fuel rod grid 16. Under the heavy duty load imposed upon the laser system 102, it is contemplated that the laser efficiency will attenuate due to the exhaustion of the laser 170 and/or its excitation lamps 186, as well as due to the presence of smoke and debris given off during the laser welding. Thus, in order to provide accurate, reproducible welds, the voltage applied to the excitation lamps 186 is increased over the life of the laser system 102 dependent upon the thermopile measurements.

Figure 5B:
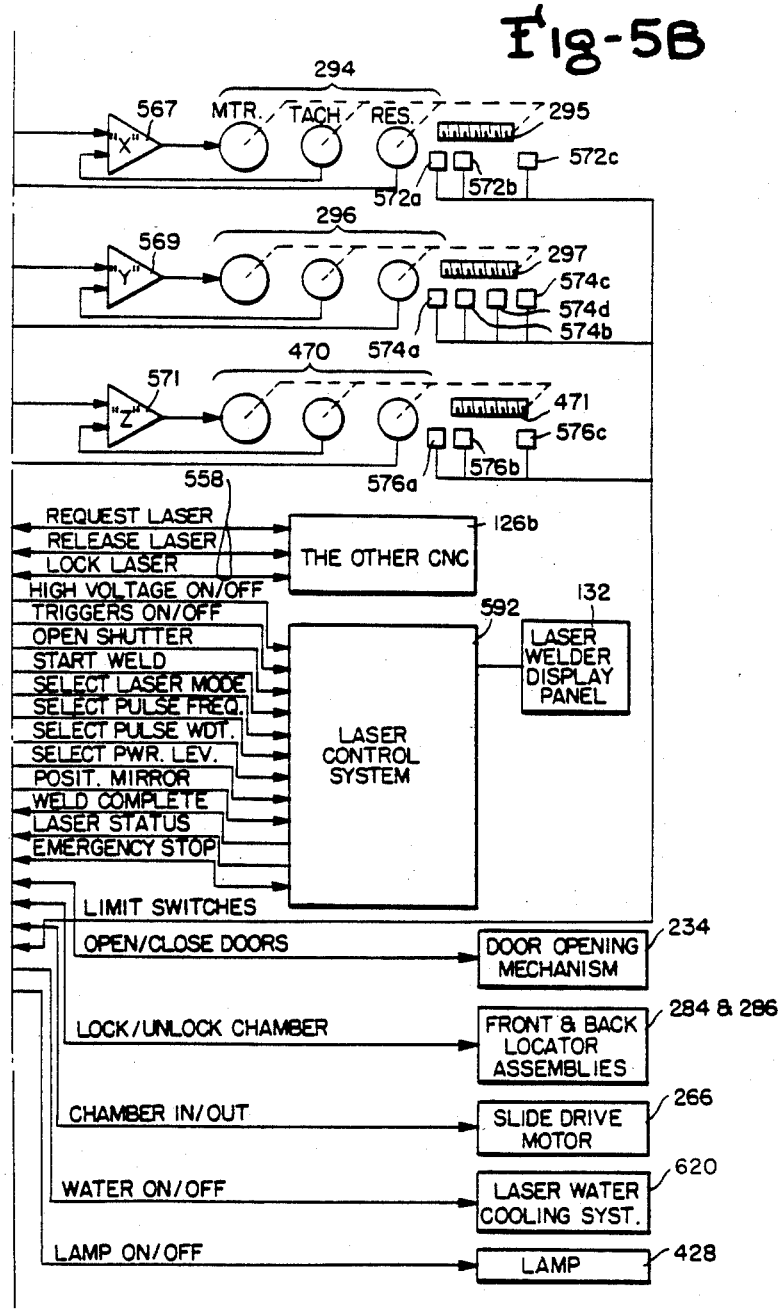

Referring now to FIGS. 5A and 5B, there is shown a functional block diagram of the computer control system 124 and in particular of the first computer numerical control (CNC) 126a and the manner of its connection to the other CNC 126b represented only by a single block within the diagram. In this regard, it is understood that the other CNC 126b comprises the same elements as does CNC 126a, as shown in FIG. 5. The CNC 126a comprises a central processor unit (CPU) and memory identified by the numeral 560. In an illustrative embodiment of this invention, the CNC 126 and in particular its CPU 560 may take the form of that computer as manufactured by the assignee of this invention under their model number 2560. The CPU 560 is provided with 64K of core memory and is particularly adapted in its architecture and in its programming for machine control. It is understood that a standard 2560 CNC contains a basic supervisory software termed herein as either a main task loop system or operating program, which acts in the nature of an executive program to oversee the operation of the entire system. In the data structure as established within the model 2560 CNC, a part program identified in FIGS. 6A and 6B by the numeral 700, programs certain codes, i.e. the S, T, and M codes, which are used to effect special or customized operations for which the 2560 CNC is readily adapted. In particular, the part program is programmed with the M, S, and T codes which call or bid subroutines termed herein application subroutines, whereby selected functions including the control of the argon flow and of selecting a particular welding mode are carried out. Further, the part program is further programmed also with X, Y, and Z codes that control the movement imparted by X and Y drive motors 294 and 296 to each of the welding chambers 108a and 108b, and the Z drive motor 470 to the laser lens assembly 204. In particular, the X and Y codes designate the amount of movement or destination to which the work piece in the form of the fuel rod grid 16 is to be moved between welding steps. In like fashion, the Z code controls the amount of movement to be imparted to the laser lens assembly 204, whereby the laser beam 178 is focused upon the fuel rod grid 16. In particular, the Z codes are needed to effect the notch seam welds 40, wherein the rotatable fixture 242 is rotated out of its normal plane perpendicular to the laser beam 178 thereby necessitating the refocusing of the laser lens assembly 204. In addition, the memory of the CPU 560 has a special storage area known as the Part Program Storage Area, which is used to store the part program for execution by the operating system program. As will be explained, the part program basically designates the steps of the process of welding in a controlled, inert atmosphere and more specifically, is programmed with the M, S and T codes, whereby the mode of welding and the rate of argon flow are effectively controlled. The Parts Program Storage Area stores the part program as described below with respect to FIGS. 6A and 6B and the application routines are described in FIGS. 7A to 7I. The part program is entered into the memory of the CPU 560 by a magnetic tape drive 586 via interface 590; in an illustrative embodiment of this invention, the magnetic tape reader 586 may take the form of that drive as manufactured by Qantex under its number 220. Alternatively, the part program can be stored on a paper tape and entered via a paper tape reader 584 via a micro-processor interface 588; illustratively, the paper tape reader 584 may take the form of that reader as manufactured by Decitex. Additionally, the micro-processor interface 588 also permits display of data messages upon the CRT 133. In addition, various parameters may be entered into the memory of the CPU 560 by the operator upon an alpha-numeric key board 131 via the interface 588.

As shown in FIG. 5B, the CPU 560 is associated through a plurality of closed loop axis drive and control boards 566, 568, and 570 associated respectively with the X and Y drive motors 294 and 296, and with the Z axis drive motor 470. It is understood that each of the drive motors is associated with its tachometer and resolver to provide an indication of the rate of travel, as well as the distance of travel, whereby extremely accurate control of the movement of the X, Y, and Z tables may be effected. The X and Y drive motors 294 and 296 drive respectively the X and Y tables, upon which is disposed the welding chamber 108, whereby the work piece in the form of the ruel rod grid 16 may be sequentially repositioned for the next laser welding step. In similar fashion, the Z axis drive motor 470 drives a Z table upon which the laser assembly 204 is mounted, whereby the laser beam 178 may be refocused onto the fuel rod grid 16. The structure of the X, Y and Z tables and their coupling to their drive motors is fully disclosed in the copending application entitled "MOVABLE MACHINING CHAMBER WITH ROTATABLE WORK PIECE FIXTURE" Ser. No. 414,263. Further, the control output signal as derived from the control board 566 is applied to a servo amplifier 567 to be compared with a signal indicative of motor speed, to provide an output signal to actuate the Y drive motor 296. As shown schematically, each of the motors 294, 296, and 470 is associated with a lead screw 295, 297, and 471 that effects drive of its corresponding X, Y, and Z tables. A set of limit switches 572 are associated with the lead screw 295 to sense the position of the lead screw 295 and, therefore, its X positioning table 290 and to provide signals via an input and output interface 562 to the CPU 560. In particular, the limit switches 572a and 572c provide output signals indicative that the X positioning table 290 has been disposed to its forward and rearward most limits of travel, whereas the limit switch 572b indicates that the X positioning table 290 is disposed at its home or reference position with respect to the laser beam 178. A similar set of limit switches is associated with the lead screw 471 driving the Z axis table. A set of limit switches 574a, b, and c is provided with the lead screw 297 driving the Y table; a fourth limit switch 574d is associated with the lead screw 297 for detecting when the Y positioning table has been disposed in its center position, i.e. that position at which the welding chamber 108 may be removed from its cabinet.

As seen in FIG. 5B, a host of peripheral devices are associated with and controlled by the CPU 560 by optically isolating interfaces 562 and 564. In particular, the other CNC 126b interchanges a set of "handshaking" signals via a CNC link 558 and the interface 562 with the CPU 560, whereby each of the CNC's 126a and 126b may bid for and obtain control of the beam switching mirror 172 in a time shared fashion. As explained in the co-pending application entitled "PLURAL COMPUTER CONTROL FOR SHARED LASER MACHINING" Ser. No. 414,208 each of the two CNC's 126a and 126b may bid for and subsequently control the beam switching mirror 172 to direct the laser beam 178 into its welding chamber 108. After use, the CNC 126 generates a release laser signal, whereby the other CNC 126 may request and subsequently lock the laser for its own use.

The laser system 102 may in one illustrative embodiment of this invention take the form of that laser system as manufactured by Raytheon under their model number SS500 and comprises the laser power supply, as well as a laser control system 592 that is coupled by the interface 562 to the CPU 560. As shown in FIG. 5B, the laser control system 592 is coupled to a laser welding display panel 132. The laser welding display panel 132 includes an array of lamps and pushbuttons that control and display the condition of the laser sysem 102 and its conrol system 592.

As seen in FIG. 5B, the CPU 560 provides control signals via the optically isolated interface 562 to actuate the laser control system 592. In particular, interface outputs are applied to the laser control system 592 to turn on or off the high voltage output of the power supply to enable the laser lamp triggers, to dispose the dump shutter 190 and the BRH safety shutter 212 to their open positions, to initiate the welding process, to select a particular mode of laser welding dependent on one of the codes M51 through M54, to set the pulse frequency (REP RATE) as derived from the T code, to set the power level as derived from the S code, to set the pulse width, and to position the beam switching mirror 172. Signals are developed by the laser control system 592 indicative of the completion of a weld as well as the laser status to be applied via the optically isolated interface 562 to the CPU 560. Upon generation of emergency stop signals, the operations of the laser welding system 102 and in particular of the laser control system 592 may be stopped in an emergency.

Further, signals are developed by the CPU 560 and are transmitted by the optically isolated interface 562 to control a door opening mechanism 234 to either open or close a set of doors 114 covering the access to a cabinet in which the welding chambers 108a and 108b are disposed. Signals are applied to lock or unlock the welding chamber 108 and in particular, are applied to each of the front and back locator assemblies 284 and 286. An output from the optically isolated interface 562 is applied to a slide drive motor 266, which is mechanically associated with a slide table (not shown). The slide table receives an X-Y positioning system including the X and Y drive motors 294 and 296 for repositioning the welding chamber 108 through a sequence of incremental movements with respect to the laser beam 178. As shown in FIG. 4, the slide drive motor 266 drives the slide table and therefore the welding chamber 108 between a first position as shown in dotted line, and a second position as shown in the full line representation of the welding chamber 108b. In the first, welding positioning, the laser beam 178 is directed onto the fuel rod grid 16 as disposed within the welding chamber 108. In the second position, the laser beam 178 is directed onto the thermopile 218, whereby a measurement of the laser power is made for calibration purposes. The front and back locator assemblies 284 and 286 are energizable to insert locating pins into the slide table, whereby the slide table is fixedly disposed in each of its first and second positions. The slide drive motor 266 and its slide table are fully described in the copending application entitled, "MOVABLE MACHINING CHAMBER WITH ROTATABLE WORK PIECE FIXTURE" Ser. No. 414,263. The output signals as derived from the sets 572, 574 and 564 of limit switches are applied to the interface 562. Signals are also applied to a laser water cooling system 620. The laser flash or excitation lamps 186 and the cavity as defined by the mirrors 182 and 184 are cooled by the closed-loop water cooling system which provides clean, pure, temperature-regulated water at the required pressure and flow rate. Though not shown, it is well understood in the art that the laser water cooling system includes a pump, a water-to-water heat exchanger, a reservoir, a deionizer, a filter, and a temperature regulator. Heat from the laser rod 170 and the beam absorber 194 is discharged to the water and removed from the system. In addition, a control signal is applied to the lamp 428 of the laser lens assembly 204, to illuminate the fuel rod grid 16, whereby the X-Y positioning system including the X and Y drive motors 294 and 296 may be disposed along either the X or Y axis to align the starting point of the fuel rod grid 16 with respect to the laser beam 178.

Inputs are provided from an oxygen probe 496 and a moisture sensor 410 that are disposed with respect to the welding chamber 108 to provide analog signals indicative in parts per million of the oxygen and water within the welding chamber atmosphere. In similar fashion, the thermopile 218 as disposed with the shield tube 216 provides an analog signal indicative of the power of the laser beam 178 directed therein. The outputs of each of the probe 496, the sensor 410, and the thermopile 218 are applied to corresponding digital volt meters 578, 580, and 582, which convert the input analog signals to corresponding digital signals to be applied via the optically isolated interface 564 to the CPU 560. The interface 564 pfovides appropriate meter select signals to each of the digital volt meters 578, 580 and 582 to selectively apply only one digital signal at a time via the interface 564 to the CPU 560. Depending upon the operation of the laser welding system 100, the CPU 560 applies signals via the optically isolated interface 564 to each of the mass flow controllers 488, 484, and 486 to control the rate of argon flow respectively to the laser lens assembly 204, the rotatable fixture 242 and the welding chamber 108. In similar fashion, signals are applied to the B axis motor 388, whereby a rotatable fixture 242 may be rotated. The rotatabale fixture 242 is shown in FIG. 4 and is rotatable as indicated by the arrow from its substantially horizontal position as shown, by a B-axis motor that is engageable with a coupling member fixedly attached to the rotatable fixture 242. The rotatable fixture 242 is also associated with a positioning wheel upon which are mounted a plurality of sensor strips that are engageable with a plurality of proximity switches 402a–d. These switches 402a–d provide a binary signal indicative of the position of the rotatable fixture 242. The CPU 560 is responsive to this binary indicative to determine the position of the rotatable fixture 242 and the fuel rod grid 16 as mounted thereon, to apply control signals to the B axis motor thus imparting a controlled movement to the rotatable fixture 242. The operation and structure of the rotatable fixture 242 in conjunction with its b-axis motor and the proximity switches 402a–d is fully explained in the copending application entitled, "MOVABLE MACHINING CHAMBER WITH ROTATABLE WORK PIECE FIXTURE" Ser. No. 414,263.

Referring now to FIG. 5, there is shown a machine function panel (MFP) 130 for providing inputs via the optically isolated interface 564 to the CPU 560. The various control functions as implemented by the pushbuttons and selector switches of the machine function panel 130 are described in the copending application entitled, "LASER MACHINING SYSTEM", Ser. No. 414,241.

The process of welding the inner grid straps 20 together and in turn to the outer grid straps 22 and the resultant grid 16 to the guide sleeves 36 has been described above with respect to FIGS. 3A to 3L; in these figures, there is illustrated the series of movements of the fuel rod grid 16 in each of its X, Y, and Z axes to appropriately position the fuel rod grid 16 with respect to the laser beam 178, whereby each of the intersect welds 32, the corner seam welds 30, the slot and tab welds 34, and the notch seam welds 40 may be effected. The inner and outer grid straps 20 and 22 are assembled to form the fuel rod grid 16 as explained in the copending applications entitled "STRAP AND VANE POSITIONING FIXTURE FOR FUEL ROD GRID AND METHOD" Ser. No. 414,917 and "GRID ASSEMBLY FIXTURE, RETENTION STRAP AND METHOD" Ser. No. 414,918. Next, the fuel rod grid 16 is disposed upon a welding fixture as described in the copending application entitled "WELDING PLATES FOR A FUEL ROD GRID" Ser. No. 414,265; the welding fixture in turn is releasably affixed by a pair of locating pins to the rotatable fixture 242 rotatably disposed within the welding chamber 108. As explained above, the fuel rod grid 16 may be rotated about its B axis to dispose the fuel rod grid 16 in position to receive the laser beam 178 to effect the notch seam welds 40. The X-Y positioning system is selectively actuated to move the welding chamber 108 in a sequence of incremental steps along their X and Y axes to position the fuel rod grid 16 with respect to the laser beam 178, whereby the intersect welds 32 are effected and after rotation upon the rotatable fixture 242, the slot and tab welds 34 and the corner seam welds 30 are effected.

Figure 6A:
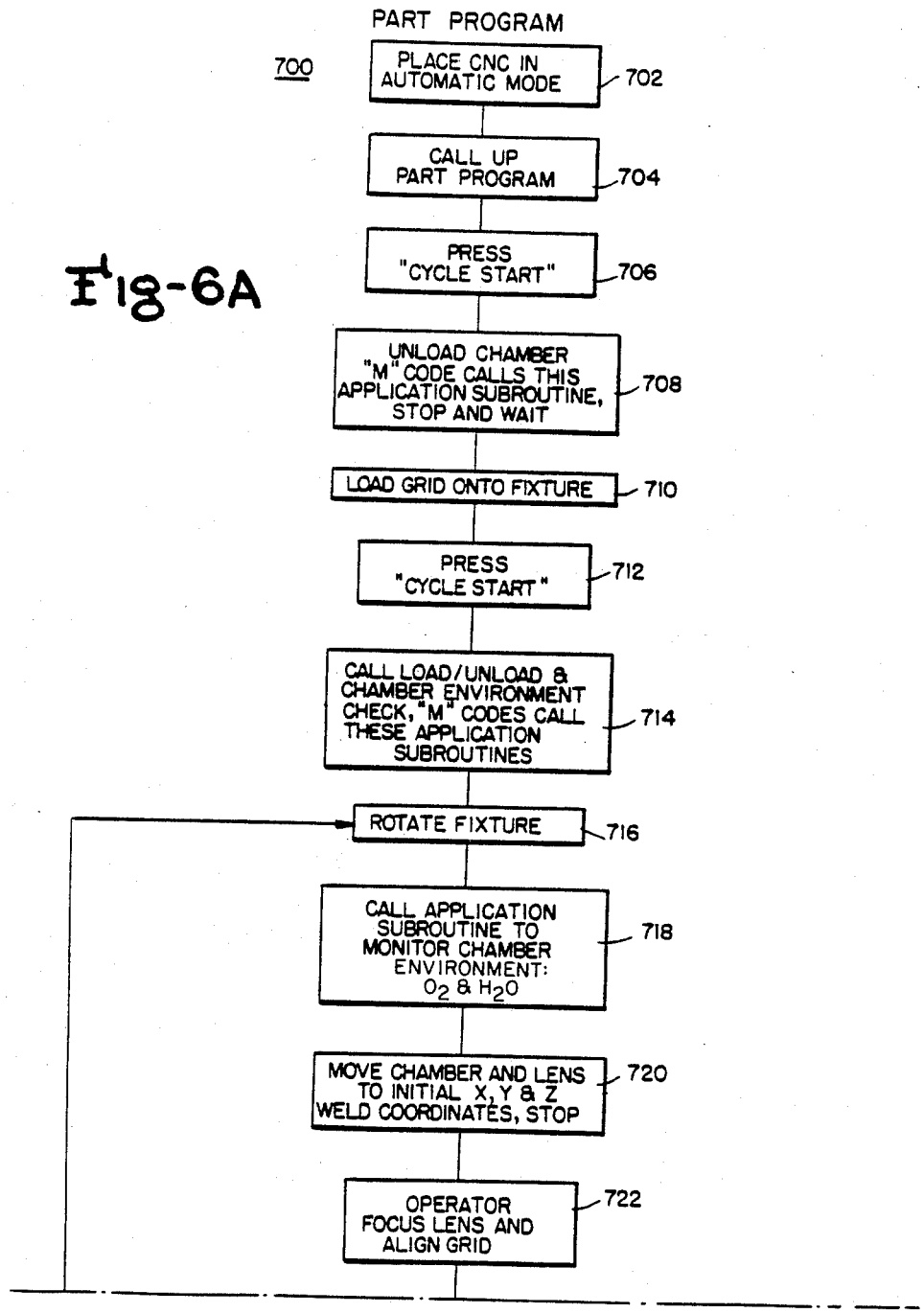

The machine control for this process is provided by the CNC 126 and in particular by the CPU 560 which includes a memory for storing the part program 700, which will now be described with respect to FIGS. 6A and 6B. The part program 700 is entered when in step 702, the operator places the CNC 126 in its automatic mode by pressing the AUTO pushbutton 670 on the machine function panel 130. Next, the operator enters a command on the alpha-numeric keyboard 131 panel to call the part program for execution. Next, the operator presses the CYCLE START pushbutton of the machine function panel 130. Next, in step 708, a programmed M81 code calls a LOAD/UNLOAD CHAMBER application subroutine to effect the actuation of the slide drive motor 266 to drive the slide table 262 from its first welding to its second, out position, whereby an operator may load an assembled, though not yet welded fuel rod grid 16 and its welding fixture onto the rotatable fixture 242. The fuel rod grid 16 and its welding fixture are locked by the locating pins in a predetermined position on the rotatable fixture 242 with respect to the laser beam 178. The LOAD/UNLOAD CHAMBER subroutine is explained in greater detail with respect to FIG. 7B. In step 710, the operator loads the fuel rod grid 16 and its welding fixture onto the rotatable fixture 242, with the assistance of the load/unload manipulator as described in the copending application entitled "WORKPIECE GRIPPING AND MANIPULATING APPARATUS FOR LASER WELDING SYSTEMS AND THE LIKE" Ser. No. 414,262. At the end of step 708, the execution of the part program is suspended until in step 712, the operator presses the CYCLE START pushbutton of the machine function panel 130 to recommence the execution of the part program 700. Next, step 714 calls the LOAD/UNLOAD application subroutine to reload the chamber 108 into its first or welding position beneath the laser beam 178. Once repositioned, an M code is used to call the CHAMBER ENVIRONMENT CHECK application subroutine before the welding chamber 108 is purged of impurities such as oxygen and water by introducing argon at a relatively high rate via the manifold tubes 336 and the diffuser plate 330, whereby the heavier argon displaces the air driving it out through the spacing between the chamber's upper flange 331 and the sealing plate 158. The particular argon flow rate is set by an M code, whereby the mass flow controller 484 is set to provide a high rate of flow to the welding chamber 108. In similar fashion, the mass flow controllers 486 and 488 associated with the rotatable fixture 242 and the laser lens assembly 204 are set to a higher flow rate to hasten the purging of the welding chamber 108. The particular M code calls the SELECT GAS FLOW RATE application routine. Next, step 716 of the part program sets the M91 codes to effect rotation of the rotatable fixture 242 and in particular to actuate the B axis rotation drive 238 to effect rotation of the fixture 242. In particular, the M91 code as executed by step 716 bids the ROTATE FIXTURE application subroutine. Step 718 serves to initiate or bid the CHAMBER ENVIRONMENT CHECK application subroutine to monitor the environment within the welding chamber 108 as to its oxygen and water content and to prevent the further execution of the part program until the levels of oxygen water are below predetermined levels.

After step 718 has determined that the environment within the welding chamber 108 is sufficiently pure, step 720 responds to X and Y codes to controllably position the welding chamber, whereby the initial weld to be made is positioned along the Z axis coinciding with the laser beam 178. The initial welding position is identified by a set of X and Y codes which are interpreted to provide appropriate control signals to the X and Y drive motors 294 and 296. In similar fashion, a Z code is interpreted and control signals are applied to the Z axis drive motor 470, whereby the laser lens assembly 204 is positioned to focus the laser beam 178 onto the initial weld of the fuel rod grid 16. After completion of these steps, step 720 brings the part program to a stop. In step 722, the operator may manually control by appropriate actuation of an X IN pushbutton, an X OUT pushbutton, an Y LEFT pushbutton and an Y RIGHT pushbutton on the machine function panel 130, position the welding chamber 108, whereby the initial weld of the fuel rod grid 16 is precisely aligned with respect to the laser beam 178. To this end, the BRH safety shutter 212 is opened, permitting the operator to view the grid image as displayed upon the CRT 133 and obtained from the alignment TV camera 206. The lens of the camera 206 has an electronic rectical by which the operator may align the initial weld precisely with respect to the laser beam 178. In similar fashion, the operator manipulates a Z UP pushbutton and a Z DOWN pushbutton of the machine function panel 130 to control the movement of the laser lens assembly 204 to precisely place the laser lens 202, whereby the laser beam 178 is focused onto the fuel rod grid 16.

In order to reinitiate the execution of the parts program 700, the operator in step 724 presses the CYCLE START pushbutton. Next, in step 726, the part program calculates the differences between the X and Y coordinates of the initial weld position and of the aligned position, i.e. the new grid position after being aligned in step 722, the differences being known as the X and Y offsets. Similarly, the difference between the initial home position along the Z axis and the focused position of the laser lens assembly 204 provides a Z offset. The X, Y, and Z offsets are stored in a designated area in memory and are used by the CNC 126 to calculate the precise position of each weld taking into account the adjusted or offset position of the fuel rod grid 16.

Figure 7D:
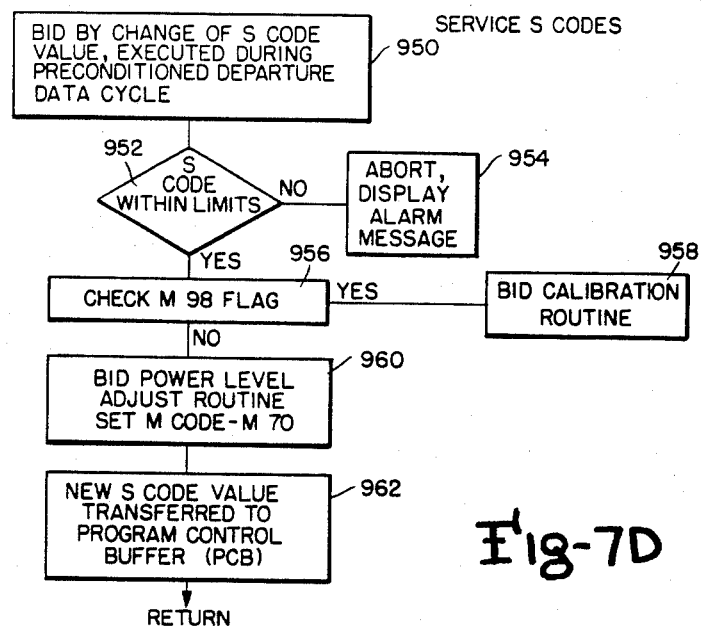

Next, step 728 sets the various parameters of the laser system 102 and in particular programs the S, T, and M codes that determine the power level, the pulse frequency, the pulse width, and the type of weld, i.e. which of the intersect weld 32, the corner seam weld 30, the slot and tab weld 34, and the notch seam weld 40, to be performed. In particular, the power level of the laser system 102 is determined by an S code which is serviced by a SERVICE S CODE application subroutine as will be explained in detail with respect to FIG. 7D. In similar fashion, the pulse frequency is set by a T CODE which is serviced by the SERVICE T CODE application subroutine as will be explained in detail later with respect to FIG. 7E. The pulse width is set by one of the M CODES M55–M60 corresponding to widths of 1 to 6 ms, which bid the execution of the SET LASER PULSE WIDTH application subroutine as shown in FIG. 7C. In similar fashion, there are four types of welds corresponding to the M codes M51 through M54, which bid the execution of the SET LASER MODE application subroutine. Next, step 730 sets by use of one of the M CODES M61 through M64 the particular argon flow rate that is required for a welding operation and in particular bids the SELECT GAS FLOW RATE application subroutine. Next, in step 732, the set one of the M codes M51 through M54 bids the PERFORM LASER WELD application subroutine, as will be explained in greater detail with respect to FIG. 7G. Generally, the PERFORM LASER WELD application subroutine first requests or bids for the use of the laser via the GET LASER application subroutine, whereby the other CNC 126b is checked by examining the REQUEST LASER and LOCK LASER output of the other CNC 126b and if present, the CNC 126a waits until the appearance of a RELEASE LASER output from the other CNC 126b, at which time the CNC 126a requests and thereafter locks the laser for its use. Upon obtaining the use of the laser system 102, the CNC 126a disposes the beam switching mirrors 172 to direct the laser beam 178 to its welding chamber 108. Thereafter, the positions of the X and Y positioning tables, upon which the welding chamber 108 is mounted, are checked to see if they have come to rest in their proper position and a positioning time out period is permitted to expire before firing the laser rod 170. Then, step 732 waits for a LASING COMPLETE signal indicating that the welding step has been completed before releasing the beam switching mirror 172 and commanding the X-Y positioning system to move the fuel rod grid 16 to its next position in preparation for performing the next in a series of welds. Next, step 736 decides whether the particular type of weld as set by one of the M codes M51 through M54 has been completed and if not, the part program returns to step 732 to perform the next weld and then in step 734, to move the fuel rod grid 16 to its next weld position. Thereafter, step 735 determines whether the M code M88 has been programmed to bid for the WAIT FOR OTHER CNC application subroutine, whereby a signal is transmitted to the other CNC 126b to indicate that a series of welds has been completed and then to wait for a response from the other CNC 126b; during this interval, the part program execution is suspended.

After a particular type of weld has been completed, the part program moves to step 738 where the part program stops and examines which of the M codes M51 through M54 has been programmed to determine the next type of weld. Thereafter, in step 740, a decision is made as to whether all of the types of welds necessary to complete the welding of at least one side of the fuel rod grid 16 has been made and if not, the part program returns to step 716, whereby the sequence of steps 716 through 738 is repeated. The first sequence of welding steps as illustrated in FIGS. 3A to 3D is carried out on the vane side of the nuclear fuel rod grid 16 before it is then necessary to remove the fuel rod grid 16 from its welding chamber 108 to be rotated and returned to the welding chamber 108. In step 742, the laser system 102 is turned off by sending a signal to dispose the dump shutter 190 to a position as shown in full line of FIG. 4 to direct the laser beam 177 into the laser absorber 194.

Thereafter, step 744 sets the M code M82 to bid for the LOAD/UNLOAD CART application subroutine, whereby the slide drive motor 266 is actuated to direct the slide table to its second, out position, whereby the fuel rod grid 16 may be removed from the welding chamber 108. At this point, the operator brings the manual manipulator to remove the fuel rod grid 16 and its welding fixture from the welding chamber 108 to perform those manual operations in preparation for the next sequence of welding steps. For example, after the intersect welds 32 on the vane side of the fuel rod grid 16 are completed as in the steps shown in FIGS. 3A to 3D, the fuel rod grid 16 is removed and rotated so that the intersect welds 32 as appearing on the opposite or guide sleeve side of the fuel rod grid 16 may be completed as seen in the steps of FIGS. 3E to 3H. After the intersect welds on both sides of the fuel rod grid 16 have been completed, the grid 16 is removed and the guide sleeves 36 are inserted therein, before effecting the notch seam welds 40 as shown in the steps 3I to 3L.

Figure 7F:
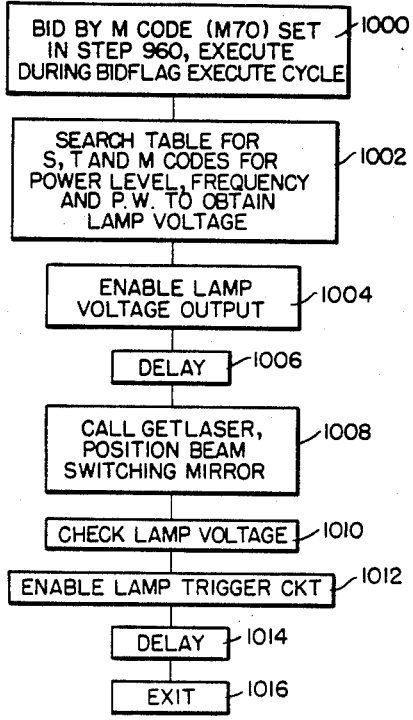

Referring now to FIG. 7A, there is shown a CALIBRATION part program whereby the operator may manually enter via the alpha-numeric keyboard 131, a command to call the CALIBRATION part program. First in step 750, The operator presses the AUTO pushbutton of the machine function panel 130. Thereafter in step 752, the operator types on the keyboard 131, a command calling the CALIBRATION part program and then in step 754, presses the CYCLE START pushbutton. Next, step 756 bids for the LOAD/UNLOAD CART application subroutine, whereby the slide table and therefore the welding chamber 108 are disposed to their second, out position, whereby as shown in solid line in FIG. 4, the laser beam 178 is directed into the shield tube 216 and onto the thermopile 218. Next, in step 758, the CNC 126 controls the Z drive motor 470 to cause the laser lens assembly 204 to focus the laser beam into the thermopile 218. The laser system 102 is set up in step 728', which performs the same operations as step 728 as shown in FIG. 6, i.e. to set the power level according to its S coce, the pulse frequency according to its T code, the pulse width according to its M code, and the weld type according to its M code, before in step 759 calling the CALIBRATION application subroutine. In particular, step 759 sets the M code M98, whereby the LASER CALIBRATION application subroutine is bid. As will be explained in detail below with respect to FIG. 7G, the LASER CALIBRATION application subroutine measures the power level of the laser beam 178 as directed onto the thermopile 218, whereby calibration of the laser system 102 and in particular its excitation lamps 186 is effected. In particular, an offset S3 is developed for each mode of welding and is placed into a table identified as RVOLBTT within the memory of the CPU 560 as shown in FIG. 5A. As explained above, the laser system 102 is operative illustratively in four different welding modes corresponding to the corner welds 30, the intersect welds 32, the slot and tab welds 34, and the notch seam welds 40. Each welding mode is characterized by a selected set of parameters corresponding to the pulse width, pulse frequency and average power level at which the emission of the laser beam 178 is controlled. As will be explained in detail later, the pulse width is set by a selected one of the programmed M codes, i.e. M codes M55–59, whereas the pulse rate frequency is set by a T code and the average power is set by a S code. For example, the intersect weld 32 includes the following set of parameters: pulse width of 6.2 ms, a frequency of 20 PPS and an average power of 350 watts. Initially step 728' sets up the laser system 102 to effect an intersect weld 32 programming the laser system 102 to generate its laser beam 178 of a power level corresponding to 350 watts. As will be explained later, step 759 calls the LASER CALIBRATION application subroutine. Assuming that the power level of the laser beam has attenuated with use, an offset S3 is calculated as indicating that a increase of programmed power is necessary to adjust the reservoir voltage as applied to the pulse forming network coupled to the excitation lamps. The offset S3 for the first welding mode corresponding to the intersect welds 32 is stored in the table RVOLBTT of the CPU's memory. A SET LASER POWER LEVEL OFFSET application subroutine as shown in FIG. 7F is called to calculate the corresponding value of the reservoir voltage for the adjusted power level, so that upon the automated performing of the intersect welds 32 by the PERFORM LASER WELDS application subroutine as shown in FIG. 7H, that the corresponding reservoir voltage necessary to generate the laser beam of the desired power level, e.g. 350 watts. After the offset S3 has been determined for the first laser mode, a second laser mode is set up by step 728', e.g. for the slot and tab welds 34, and again the CALIBRATION part program moves to step 759 calling the CALIBRATION application subroutine to take a measurement of the actual laser power as measured by the thermopile 218, whereby a corresponding offset S3 may be determined for the slot and tab mode of welding. In like fashion, step 728' is again entered for each of the corner mode and notch seam mode of welding and corresponding offsets are calculated and placed into the table RVOLBTT within the memory of the CPU 560. After the offsets S3 for each machining mode are thus derived and placed in the CPU memory, the corresponding values of the reservoir voltage for each offset S3 is calculated and stored by the called CALIBRATION application subroutine in the designated table of the CPU memory. In this way, the operator at selected times may effect a calibration of the laser system 102 noting that the efficiency of the laser rod 170 and its excitation lamps 186 attenuate with intense use of this laser welding system 100, i.e. the laser welding system 100 continuously excites the laser rod 170 to thereby ensure a high work duty ratio and as a result, a high production rate of the fuel rod grids 16. It is contemplated that the laser excitation lamps 186 may need to be replaced as often as every two days. In the course of continuous use, the operator will wish to check the actual power output of the laser rod 170 and to measure by the thermopile 218 its energy level as impinging on the workpiece, whereby an adjustment of the output of the laser high voltage supply may be effected to maintain the intensity of the laser beam 178 at a level whereby uniform welds are achieved, regardless of the work life of the laser rod 170 or its excitation lamps 186.

The CALIBRATION part program as described above with respect to FIG. 7A is essentially an off line procedure permitting the operator to manually call at his option the CALIBRATION application subroutine, whereby the intensity of power level of the laser beam 178 may be periodically adjusted or calibrated. It is also contemplated within the teachings of this invention, that the computer system automatically call the CALIBRATION application subroutine as will be described below in detail with respect to FIG. 7G. For example, the CALIBRATION application subroutine may be called by a change of one of the M codes M51 through M54 indicating a change of welding mode. For example, in step 738 of the part program as shown in FIG. 6B, the CALIBRATION application subroutine is called by the change of the M code to effect an adjustment of the laser beam power level for the new laser machining mode. In such an embodiment, the bid CALIBRATION application subroutine will calculate the necessary offset S3 and the reservoir voltage before calling the SET LASER POWER LEVEL OFFSET application subroutine, whereby the corresponding reservoir voltage will be applied to the laser pulse forming network to be used during the new machining mode. Alternatively, it is contemplated that the service program routinely call at programmed intervals the CALIBRATION application subroutine to effect the desired adjustment or calibration of the laser beam power.

The laser CALIBRATION application subroutine as shown in FIG. 7G is entered by the setting of the M code M98 in step 759 and generally calculates the reservoir voltage RESVOLT as applied to the pulse forming network (PFN), whereby its output voltage as applied to the excitation lamps 186 is adjusted for the programmed power level according to the selected S code, pulse width, and pulse repetition rate (T code). The laser CALIBRATION application subroutine then fires the laser rod 170, takes a reading of the output of the thermopile 218 and compares the thermopile output with the programmed power level; the difference between the calculated and measured output of the thermopile 218 is used to adjust the reservoir voltage output. This reiteration process continues until the measured and programmed laser power levels are within a predetermined difference, e.g. 2 watts. When divergence is reached, the new value of the reservoir voltage is stored at a specified location within the memory of the CPU 560. Initially after entry in step 759, step 1022 solves equations 1 and 2 for a value of the reservoir voltage (RESVOLT) based upon the particular characteristics of the pulse forming network of a particular illustrative laser system, namely the model number SS500 as manufactured by Raytheon. Calculations have been carried out for the particular pulse forming network of the noted Raytheon laser system to provide a curve as shown in FIG. 7K that was calculated to provide parameters characterizing the pulse forming network factor as a function of the repetition rate or REP RATE. The parameter M in equation 1 is defined as the slope of the empirically derived curve of FIG. 7I, and the offset of the curve at zero REP RATE is taken for this pulse forming network as a value of 57; the slope M has an illustrative value of 0.33. The value of the pulse forming network factor PFNFACTR is calculated in equation 1 and is substituted into equation 2 along with suitable values of the desired power output of the laser beam 178 in accordance with the programmed S code, the REP RATE as determined by the T code, and the pulse width as determined by the selected M code to provide in accordance with the terms of equation 2 a calculated value of the reservoir voltage RESVOLT. Next, step 1024 scales the calculated value of RESVOLT for the digital to analog D/A circuit of the particular Raytheon laser system 102. Next, the calculated value of RESVOLT is checked by a safe power level SAFEPWR application subroutine that is called and executed as will be explained in detail as with respect to FIG. 7I. If the calculated RESVOLT is safe, step 1028 energizes the pulse forming network and after a suitable delay as timed in step 1030, step 1032 actuates the beam switching mirror 172 to direct the laser beam 178 to the welding chamber 108 being controlled. Next, step 1034 determines whether the excitation lamps 186 are energized and if not, an alarm message is displayed by step 1036 on the CRT 133. If the excitation lamps 186 have been turned on, the trigger circuit associated with the excitation lamps 186 is enabled before step 1040 opens the dump shutter 190. Next, step 1042 opens the innercavity shutter 188 to permit the laser rod 170 to emit the laser beam into the thermopile 218. Step 1044 times a suitable period before closing the innercavity shutter 188, accesses the output of thermopile 218 and converts the analog thermopile output to a corresponding digital manifestation. Step 1046 compares the measured laser power level with the programmed value thereof in accordance with the S code and if the difference is within 2 watts plus or minus, the corresponding value of the reservoir voltage RESVOLT is stored in a table of the memory of the CPU 560. If divergence is not met, step 1050 determines whether this is the 6th loop of the steps 1022 to 1046, and if so, step 1052 displays upon the CRT 133 an alarm message that the laser CALIBRATION application subroutine is unable to reach divergence. If less than the 6th loop, step 1054 calculates an offset or modified value S3 of the S code in accordance with the equation shown in step 1054 of FIG. 25M, where S1 is the initially programmed S code, MEAS POWER is the power of the laser beam 178 measured in step 1046 by the thermopile 218, and S2 is the previously calculated offset. The modified offset S3 is returned and used in step 1022 to calculate a new value of RESVOLT in accordance with the second equation, which value of RESVOLT is placed into the table RVOLBTT of the CPU's memory by step 728' of the CALIBRATION part program. Thereafter, steps 1024 through steps 1054 are repeated until divergence is obtained or six loops have been completed. As shown in FIG. 7G, when divergence is obtained as determined in step 1046, the reservoir voltage as applied to the pulse forming network of the laser system 102 is stored in a table in memory, whereby a compensation of the laser output beam is effectively made, and the energy input for each weld is held substantially constant over a long period of time thus assuring weld uniformity. As explained above with regard to FIG. 7A, the CALIBRATION application subroutine is called for each mode of welding, whereby an offset S3 for each of the intersect welds 32, slot and tab welds 34, corner seam welds 30 and notch seam welds 40 is calculated and placed into the CPU's memory.

The LOAD/UNLOAD CART application subroutine is shown in FIG. 7B for actuating the slide drive motor 266 to dispose the slide table 262 and its welding chamber 108 between its first, in, and its second (welding) position out position, while insuring that the door 114 is open, the laser lens assembly 204 is retracted, and the locating pins 316 and 319 are removed, permitting the slide table 262 to move. Initially in step 760, the M code as set in step 708 of the part program as shown in FIG. 6 is executed during the Bidflag Execute Cycle of the operating system program. In particular, step 708 sets an M code M82 to unload the slide table 262 and its welding chamber 108, whereas in step 710, an M code M81 is set whereby the slide table 262 is returned to its first, welding position. Next, step 762 accesses the safety zone 134 in front of the welding chamber 108 to be moved and if free, step 764 actuates the Z drive motor 470 to move the laser lens assembly 204 to its home position. Next, step 766 actuates the X and Y drive motors 294 and 296 to dispose the X and Y positioning tables 290 and 292 to their center position and to their home or extended position, respectively. Next, step 768 sets the FEED HOLD to bring the X and Y positioning tables 290 and 292 to a halt, and the door opening mechanism 234 is actuated to dispose the door 114 to its open position. Next, the front and back locator assemblies 284 and 286 are actuated to raise their locating pins 316 and 319, thereby freeing the slide table 262. Thereafter, step 772 actuates the slide drive motor 266 to direct the slide table 262 outwardly when an M code M82 has been set or inwardly when an M code M81 has been set. Then, step 774 actuates the front and back locator assemblies 284 and 286 to dispose their locator pins 316 and 319 into a locking position with respect to the slide table 262. Next, the cabinet door 114 is closed in response to the M code M81, and in step 780, the FEED HOLD is released. In step 782, a decision is made as to whether the M code M81 has been set indicating that the welding chamber 108 is to be loaded and if so, the CHAMBER ENVIRONMENT CHECK application subroutine is bid to ensure that the atmosphere within the welding chamber 108 is of sufficient purity to permit welding. Thereafter, step 784 clears the routines Bidflag and sequence pointer before exiting.

Referring now to FIG. 7C, the SET LASER PULSE WIDTH application subroutine is shown. Initially in step 910, this application subroutine is entered by setting one of the M codes M55 through M59 dependent upon the selected one of possible five laser pulse widths in step 728 of the part program shown in FIG. 6B, and is executed subsequently during the next Bidflag Execute Cycle Step 912 which interprets and accesses the selected M code in the data pool of the memory of the CPU 560. Step 914 checks the safe power level of the laser beam 178 as calculated with the selected pulse width by bidding the SAFEPWR application subroutine as will be described in detail in FIG. 7I. Step 916 determines whether the calculated power level is safe, i.e. less than maximum limits, and if not, step 918 sets an alarm whereby an immediate stop to the part program is effected. If safe, step 920 resets the SELECT PULSE WIDTH OUTPUT of the interface 562, and step 922 sets the SELECTED PULSE WIDTH OUTPUT, whereby the laser control system 592 sets the desired pulse width of the laser beam 178. In this regard, it is noted that only one of the parent and other CNC's 126 may set the pulse width, with the other CNC 126 adopting the pulse width as set by the selected or PRIME CNC 126. As will be explained in greater detail with regard to the copending application entitled "PLURAL COMPUTER CONTROL FOR SHARED LASER MACHINING" Ser. No. 414,204, one of the two CNC's 126 is designated as the PRIME CNC and in effect controls the pulse width and frequency of the pulsing of the laser control system 592 of the other CNC. However, each CNC 126 selectively controls the reservoir voltage or output voltage from its laser power supply, whereby an individual adjustment may be made of the power level of the laser beam 178 as applied to the welding chamber 108 associated with each CNC 126. Since each welding chamber 108 is effecting a similar type of weld, a single CNC 126 designated as PRIME selects the pulse width and REP RATE, whereas an individual adjustment of the reservoir voltage or RESVOLT is desired to permit individual adjustment of each of the laser beams directed to each welding chamber 108 for the different conditions of the separate optical paths, laser lens assemblies 204 and welding chambers 108.

Referring now to FIG. 7D, the SERVICE S CODE application subroutine is shown, wherein a change of an S code in step 728 of the part program bids the SERVICE S CODE application subroutine to be executed during the preconditioned departure data cycle of the operating system program. The S codes determine the laser operating voltage and in particular that voltage that is applied to the excitation lamps 186. After being bid in step 950, step 952 determines whether the new S code is within limits and if not, this application subroutine is aborted and an alarm message is displayed in step 954 on the CRT 133. If within limits, step 956 determines the presence of the M98 flag that is manually set by the operator to bid in step 958 of te CALIBRATION part program as shown in FIG. 7A. Next, step 960 bids or calls the SET LASER POWER LEVEL OFFSET application subroutine as described more fully with respect to FIG. 7F. Finally, the new S code value is transferred to the Program Control Buffer (PCB) within the memory of the CPU 560.

Figure 7E:
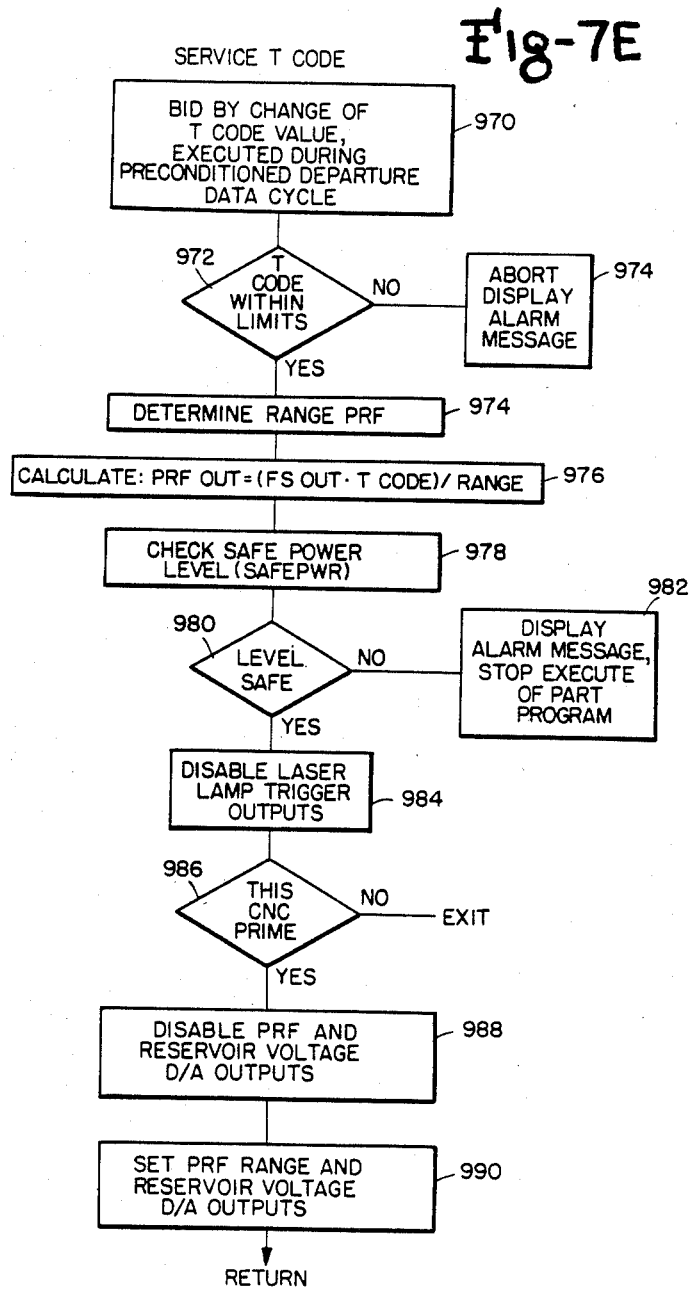

The SERVICE T CODE application subroutine is shown in FIG. 7E for calculating the values of the laser pulse REP RATE or frequency (PRF) as set by the T code in step 728 of the part program 700 of FIG. 6B. Step 970 initiates the SERVICE T CODE application subroutine by examining the Converted Data Buffer (CDB) of the memory of the CPU 560. When a change is observed, the new T CODE is transferred to te Program Control Buffer (PCB) of the CPU memory, and the SERVICE T CODE application subroutine is bid and executed during the preconditioned departure data cycle of the operating system program to determine whether the new value of the T code is acceptable or not. In step 972, the new value of the T code is checked with predetermined limits and if outside these limits, the application routine is aborted and a suitable alarm message is displayed upon the CRT 133. If within limits, step 974 determines the PRF range associated with the digital analog converter as incorporated within the laser control system 592. As shown in FIG. 5, the laser control system 592 receives a digital output upon the line marked SELECT PULSE FREQUENCY, which digital output has a corresponding range selected so that the laser control system 592 may generate a precise analog value of the digital output. Next, step 976 calculates the PRF digital/analog output value (PRFOUT) in accordance with the indicated equation, where FSOUT is the full scale output of the particular digital/analog unit, T CODE is the T code value, and RANGE is the maximum value of each PRF RANGE. It is understood that the calculated value of PRFOUT is applied via the SELECT PULSE FREQUENCY OUTPUT of the optically isolated interface 562 to the laser control system 592. Next, step 978 bids the CHECK SAFE POWER LEVEL (SAFEPWR) application routine as will be explained in detail with respect to FIG. 7I. The calculated value of safe power is compared with known limits and if outside those limits, the execution of the part program is suspended and an alarm message is displayed upon the CRT 133. If safe, the trigger signals as applied by the optically isolated interface 562 to the laser control system 592 are turned off, and step 986 determines whether this CNC 126 is PRIME, i.e. that the laser pulse REP RATE and the pulse width are selected by this CNC 126, and if not, an exit is made from this application subroutine. Otherwise, step 988 disables the select pulse frequency output and the reservoir voltage output before step 990 sets the select pulse frequency output with the desired PRF range and percentage of range signals to be applied via the select power level output to the laser control system 592.

The SET LASER POWER LEVEL OFFSET application subroutine, as shown in FIG. 7F, is bid by a change of the S code or of any M code as noted by the programming of an M code M70 and is executed during the subsequent Bidflag Execute Cycle of the operating system program. For example, when there has been a change of the S code, the SERVICE S CODE application subroutine is executed and in its step 960, the SET LASER POWER LEVEL OFFSET application subroutine is bid. When there has been a change of the M code, the M code M70 is set thereby bidding this application routine. Generally, the SET LASER POWER LEVEL OFFSET application subroutine obtains the reservoir voltage based upon the programmed pulse REP RATE rate as set by the T code and upon the programmed pulse width stored in a table in the CPU memory. The reservoir voltage is the output voltage of the laser power supply 120 that is applied to a pulse forming network, whereby the lamp energizing voltages are generated. In step 1002, the offset table within the CPU memory is searched for the programmed S, T, and M codes setting the levels of power, frequency, and pulse width to thereby obtain an indication of the reservoir voltage. Step 1004 enables the SELECT POWER LEVEL OUTPUT (see FIG. 5), before step 1006 initiates a timing delay. Next, step 1008 actuates the beam switching mirror 172 to direct the laser beam 178 to the welding chamber 108 of this CNC 126a. Next, 1010 checks whether the lamp voltage is within limits and thereafter enables in step 1012 the laser trigger circuits, i.e. the TRIGGERS output of the optically isolated interface 562 is turned on. Thereafter, step 1014 initiates a time delay to permit the excitation lamps 186 to reach stabilization before exiting in step 1016. Thus, when the PERFORM LASER WELD application subroutine, as will be described with respect to FIG. 7H, is called, the laser rod 170 is prepared to emit its laser beam 177.

The PERFORM LASER WELDS application subroutine is shown in FIG. 7H and is bid by the M codes M71 and M72 as set in step 728 of the part program and executed during the next Bidflag Execute Cycle. Upon entering in step 1060, the application subroutine Bidflag is set to execute on the subsequent Bidflag Execute Cycle. After entering, step 1062 determines whether one of the laser modes corresponding to one of the codes M51 through M54 has been selected. As explained above, the laser control system 592 includes four separate modules, each hard wired and programmed to control one of the intersect welds 32, slot and tab welds 34, corner seam welds 30, or notch seam welds 40. If no, step 1063 displays an "ERROR MESSAGE" before exiting the routine. If yes, step 1064 checks to determine whether the GO flag had been previously set in the CHAMBER ENVIRONMENT CHECK application subroutine. If not, the step 1066 rebids the CHAMBER ENVIRONMENT CHECK application subroutine to again determine whether the atmosphere within the welding chamber 108 has been purified so that its oxygen and water content is below the specified limits. If yes, step 1068 actuates the beam switching mirror 172 to direct the laser beam 178 to the welding chamber 108 of this CNC 126. Thereafter, the dump shutter 190 is disposed to its open position, whereby the laser beam 177 is directed into the selected welding chamber 108. Thereafter, step 1072 determines whether the M code M71 has been set. As indicated above, there are two M codes, i.e. M71 and M72, the code M71 indicating that a spot weld, corresponding to the intersect welds 32, is to be performed, whereas an M72 code indicates that a seam weld corresponding to the corner seam welds 30, the slot and tab welds 34, and the notch seam weld 40 is to be effected. A seam weld differs from a spot weld in that the fuel rod grid 16 is moved by the X-Y positioning system 288 while the laser rod 170 emits a series of pulses of the laser beam 178, whereas a spot weld is effected with the fuel rod grids 16 being kept stationary with respect to the laser beam 178. Thus, if an M71 CODE is detected, indicative that a spot weld is to be performed, step 1074 effects a delay to wait for the X-Y positioning system 288 to come to a halt before causing the laser rod 170 to fire. On the other hand, if an M72 CODE is programmed, indicating that a seam weld is to be performed, no delay is imparted thus permitting the laser rod 170 to initiate welding before the movement of the fuel rod grid 16 begins. Next, step 1076 checks to determine whether the voltage applied to the excitation lamps 186 is as programmed. Thereafter, step 1087 checks the status of the laser and in particular determines whether the temperature and flow rate of the lamp coolant are within specified limits, whether the current and voltage of the lamp power are within specified limits, and whether the cabinet door is open. Thereafter, step 1080 determines whether the lamp trigger circuits have been successfully triggered by step 1012 of the SET LASER POWER LEVEL OFFSET application subroutine as shown in FIG. 7F. If not set, step 1082 displays an alarm message "Trigger Circuit Not Enabled" on the CRT 133. If enabled, step 1084 effects laser firing by enabling the shutter control module of the laser control system 592, i.e. applies the start weld signal thereto. Step 1086 initiates the timing of a delay period during which the laser rod 170 is programmed to complete its lasing, i.e. waits to receive the weld complete signal from the laser control system 592. Step 1088 determines whether a period of eight seconds has expired and if not expired, displays a message "Lasing Completion Time Out" on the CRT 133. After timing out, step 1092 determines whether a spot weld is to be performed, i.e. has the M CODE M71 been set, and if so, the subroutine moves to step 1096 wherein the CPU 560 generates via the optical interface 562 a Release Laser signal on the CNC link 558 indicating that the laser rod 170 has been released and that the other CNC 126b may now request the laser. If a seam weld has been performed, step 1094 closes the dump shutter 190 and the safety BRH shutter 212, before exiting in step 1096.

Figure 7I:
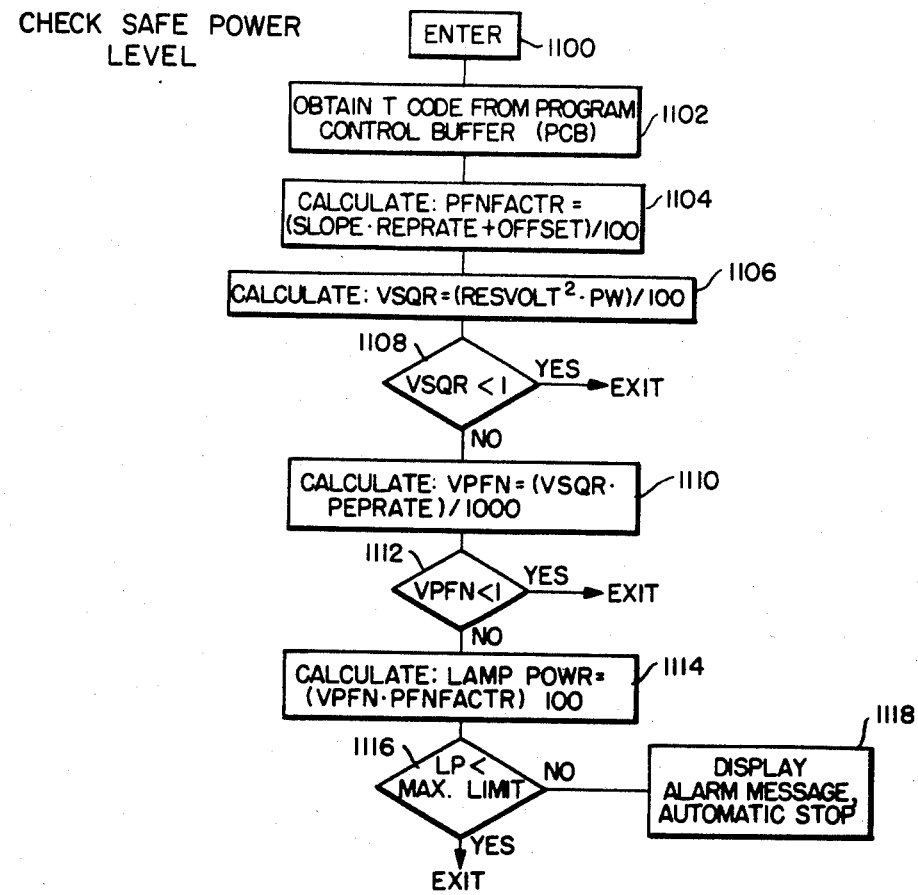

The CHECK SAFE POWER LEVEL application subroutine is shown in FIG. 7I and is executed to calculate the laser lamp power required for a given REP RATE and pulse width as programmed by T codes and the M codes M55 through M57, and for the laser lamp voltage as determined in the SET LASER POWER LEVEL OFFSET application subroutine as explained above with respect to FIG. 7F. For the illustrative laser system 102, i.e. the Rathyeon model numberSS500, the maximum safe power level is in the order of 16 kilowatts and if the calculated lamp laser power exceeds that level, the part program is automatically stopped. The CHECK SAFE POWER LEVEL application subroutine is entered in step 1100 from either step 914 of the SET LASER PULSE WIDTH application subroutine shown in FIG. 7C, step 978 of the SERVICE T CODE application subroutine as shown in FIG. 7E, or step 1026 of the LASER CALIBRATION application subroutine of FIG. 7G. Next, in step 1102, the current T code values are obtained from the Program Control Buffer (PCB) of the CPU memory and are used in step 1104 to calculate the pulse forming network factor in accordance with the indicated equation, where the value of REP RATE is indicative of the pulse frequency as programmed by the T code value, the OFFSET is obtained from the OFFSET table as entered by the SET LASER POWER LEVEL OFFSET application subroutine of FIG. 7F, and the slope is that slope as determined from the curve of FIG. 7K. Next, step 1106 calculates an intermediate value VSQR as a function of the pulse width as set by the M codes M55 through M60 and the value of the reservoir voltage (RESOLVT). If VSQR is less than one, it is known that the lamp power is within the desired maximum limit and an exit is made from this application subroutine. If not, step 1110 calculates a value of the voltage applied to the pulse forming network (VPFN) in accordance with the indicated equation, using the intermediate value VSQR, and if BPFN is less than one, an exit is made in that there has been determined that the laser lamp power is below the maximum safe level. If not, there is an indication that the lamp power may exceed the maximum safety limit and if so, step 1114 calculates the lamp power in accordance with the values of BPFN and PFNFACTR. If the value of the lamp power is below the maximum safe limit, an exit is made, but if not, step 1118 displays an alarm message on the CRT 133 and the part program is automatically stopped. A G register of the CPU 560 is used as a check return indicator for the calling routine, whereby upon exiting of the CHECK SAFE POWER LEVEL application subroutine, a return may be made to one of the SET LASER PULSE WIDTH, the SERVICE T CODE, or the LASER POWER LEVEL OFFSET application subroutines.

Thus, there is disclosed computer controlled apparatus for laser machining a work piece in the illustrative form of a nuclear rod grid. The work piece is machined in a selected one of a plurality of machining modes, each mode having distinct lasing parameters as to power, frequency and pulse width. More specifically, the computer controlled apparatus is programmed to take measurements of the power level of the emitted laser beam and of using that measurement to calibrate the laser source for each of its machining modes. Thus, that when the laser source is being controlled by the computer in a sequence of lasing steps that each welding mode is carried out at a precise power level for each set of parameters. As explained above, the laser source includes excitation lamps as energized by a pulse forming network to which is applied an adjustable reservoir voltage to achieve lasing at the programmed power level. In particular, an offset is determined for each machining mode and a corresponding reservoir voltage is calculated for that mode, whereby the laser beam emitted at the desired pulse width and repetition rate is of the programmed power level.

In considering this invention, it should be remembered that the present disclosure is illustrative only and the scope of the invention should be determined by the appended claims.

We claim:

1. Computer controlled apparatus for laser machining a work piece in a sequence of at least first and second laser machining steps, the first and second laser machining steps including machining with a laser beam generated in accordance with at least first and second sets of distinct lasing parameters corresponding to first and second machining modes, respectively, said laser machining apparatus comprising:
   (a) a laser source for emitting a laser beam;
   (b) means responsive to a control signal for exciting said laser source to emit the laser beam of a power corresponding to said control signal;
   (c) optical means for directing the beam along a laser path onto the work piece;
   (d) means disposable to intercept the laser path for measuring the power of the laser beam as it would be directed onto the work piece; and
   (e) computer control means coupled to each of said exciting means and said measuring means, and including calibration means responsive to the measured power of the directed laser beam for providing the control signal for each of said first and second machining modes as a function of the measured power and the first and second sets of laser parameters, respectively.

2. The computer controlled laser machining apparatus as claimed in claim 1, wherein said exciting means excites said laser source to emit the laser beam in a series of controlled pulses.

3. The computer controlled laser machining apparatus as claimed in claim 2, wherein each of said first and second sets of lasing parameters includes a parameter indicative of a predetermined power level of the laser beam.

4. The computer controlled laser machining apparatus as claimed in claim 3, wherein each of said first and second sets of parameters includes parameters indicative of the pulse width and frequency of the controlled laser pulses.

5. The computer controlled laser machining apparatus as claimed in claim 4, wherein said computer control means comprises means for comparing the measured power of the directed laser beam and the value of the programmed parameter indicative of the power level to provide a signal indicative of the difference therebetween.

6. The computer controlled laser machining apparatus as claimed in claim 5, wherein said computer control means comprises means responsive to said difference signal for adjusting said control signal, whereby the actual power level of the emitted laser beam is adjusted accordingly.

7. The computer controlled laser machining apparatus as claimed in claim 6, wherein said exciting means comprises at least one excitation lamp for generating and directing exciting radiation one to said laser source, and a pulse forming network energizable by a reservoir voltage of a value corresponding to the control signal, said adjusting means varying the reservoir voltage as a function of the difference signal.

8. The computer controlled laser machining apparatus as claimed in claim 7, wherein said computer control means comprises a memory and means for determining the reservoir voltage for each machining mode in accordance with its set of parameters and for storing the determined reservoir voltages into said memory.

9. The computer controlled laser machining apparatus as claimed in claim 8, wherein said determining means determines the reservoir voltage in accordance with a function imperically determined in accordance with the characteristics of said pulse forming network.

10. The computer controlled laser machining apparatus as claimed in claim 3, wherein said computer control means comprises means for comparing the measured power of the directed laser beam and the value of the programmed parameter indicative of the power level, to provide a signal indicative of the difference therebetween.

11. The computer controlled laser machining apparatus as claimed in claim 10, wherein said computer control means comprises means responsive to said difference signal for adjusting said control signal, whereby the actual power level of the emitted laser beam is adjusted accordingly.

12. The computer controlled laser machining apparatus as claimed in claim 1, wherein said first machining mode corresponds to spot welding of the work piece and the second machining mode corresponds to seam welding of the work piece.

13. The computer controlled laser machining apparatus as claimed in claim 12, wherein there is included means for incrementally moving the work piece with respect to the laser beam.

14. The computer controlled laser machining apparatus as claimed in claim 13, wherein said control means controls said work piece moving means in said first machining mode to dispose the work piece stationary with respect to the laser beam during the spot welding of the work piece and operative in the second machining mode to move the work piece with respect to the laser beam, whereby a seal weld is effected.

15. The computer controlled laser machining apparatus as claimed in claim 1, wherein there is included means for disposing said measuring means between a first position, wherein said measuring means intercepts the laser path to effect a measurement of the power level of the laser beam, and a second position remote of the laser beam.

16. The computer controlled laser machining apparatus as claimed in claim 1, wherein there is further included manually operable means for actuating said calibration means for providing a control signal for each of said first and second machining modes.

17. The computer controlled laser machining apparatus as claimed in claim 1, wherein said computer control means includes means responsive to a mode change from said first machining mode to said second machining mode, for actuating said calibration means to provide a control signal for said second machining mode.

* * * * *